(12) United States Patent
Onomichi et al.

(10) Patent No.: US 6,542,292 B2
(45) Date of Patent: Apr. 1, 2003

(54) INFRARED ABSORPTION FILTER

(75) Inventors: Shinya Onomichi, Ohtsu (JP); Tetsuo Shimomura, Ohtsu (JP); Seiichiro Yokoyama, Osaka (JP)

(73) Assignee: Toyo Boseki Kabushiki Kaisha (JP)

( * ) Notice: Subject to any disclaimer, the term of this patent is extended or adjusted under 35 U.S.C. 154(b) by 0 days.

(21) Appl. No.: 09/740,519

(22) Filed: Dec. 19, 2000

(65) Prior Publication Data

US 2001/0005278 A1 Jun. 28, 2001

(30) Foreign Application Priority Data

Dec. 20, 1999 (JP) .......................................... 11-361500
Dec. 27, 1999 (JP) .......................................... 11-370559
Mar. 15, 2000 (JP) .......................................... 2000-72273

(51) Int. Cl.$^7$ .............................. G02B 5/22; F21V 9/04
(52) U.S. Cl. .................... 359/350; 359/885; 252/587; 252/582
(58) Field of Search ................................ 359/350, 885; 156/134; 252/587, 582; 428/64, 65; 540/137; 313/479, 112

(56) References Cited

U.S. PATENT DOCUMENTS

| | | | |
|---|---|---|---|
| 4,495,020 A | * 1/1985 | Nakabayashi et al. | 156/314 |
| 4,590,118 A | 5/1986 | Yatabe et al. | 428/215 |
| 4,615,989 A | 10/1986 | Ritze | |
| 4,767,571 A | 8/1988 | Suzuki et al. | 252/587 |
| 5,215,799 A | * 6/1993 | Sakoda et al. | 428/64 |
| 5,359,056 A | * 10/1994 | Kaieda et al. | 540/137 |
| 5,466,755 A | 11/1995 | Sakagami et al. | 525/326.6 |
| 5,518,810 A | 5/1996 | Nishihara et al. | 428/328 |
| 5,807,511 A | * 9/1998 | Kunimatsu et al. | 359/885 |
| 6,117,370 A | * 9/2000 | Hasegawa et al. | 359/885 |
| 6,217,796 B1 | * 4/2001 | Hasegawa et al. | 359/885 |
| 6,333,592 B1 | * 12/2001 | Sasa et al. | 313/112 |

FOREIGN PATENT DOCUMENTS

| | | |
|---|---|---|
| EP | 0 687 923 | 12/1995 |
| EP | 0 838 475 | 4/1998 |
| EP | 0 878 528 | 11/1998 |
| EP | 0 894 620 | 2/1999 |
| EP | 1 001 282 | 5/2000 |
| GB | 1 206 066 | 8/1970 |
| JP | 55-21091 | 2/1980 |
| JP | 57-21458 | 2/1982 |
| JP | 57-198413 | 12/1982 |
| JP | 59-184745 | 10/1984 |

(List continued on next page.)

OTHER PUBLICATIONS

Patent Abstracts of Japan, vol. 18, No. 253, May 13, 1994 & JP 06 034813 A (Sekisui Chemical Co LTD), Feb. 10, 1994.
Patent Abstracts of Japan, vol. 1999, No. 13, Nov. 30, 1999 & JP 11 231126 A (Toyobo Co LTD), Aug. 27, 1999.
Patent Abstracts of Japan, vol. 2000, No. 02, Feb. 29, 2000 & JP 11 302308 A 9Mitsubishi Rayon Co LTD), Nov. 2, 1999.
Patent Abstracts of Japan, vol. 2000, No. 04, Aug. 31, 2000 & JP 2000 007870 A (Kureha Chem Ind Co LTD), Jan. 11, 2000.

Primary Examiner—Audrey Chang
(74) Attorney, Agent, or Firm—Kenyon & Kenyon

(57) ABSTRACT

An infrared absorption filter which has absorption in the near-infrared region, manifests high light transmission in the visible region, and does not have large absorption of specific wavelength in the visible region, further, is excellent in environmental stability and durability and has little optical defect, the filter comprising an infrared absorption layer laminated at least on one surface of a transparent polymer film, wherein said transparent polymer film is a film comprising a polymer easy adhesion layer laminated at least on one surface, said transparent polymer film contains substantially no particle, and said transparent polymer film contains foreign materials having a size of 20 μm or more in an amount of 10/m$^2$ or less per unit area of the film.

21 Claims, 7 Drawing Sheets

FOREIGN PATENT DOCUMENTS

| | | | |
|---|---|---|---|
| JP | 60-43605 | 3/1985 | |
| JP | 60-235740 | 11/1985 | |
| JP | 62-153144 | 7/1987 | |
| JP | 05017560 A * | 1/1993 | ................ 528/298 |
| JP | 6-324213 | 11/1994 | |
| JP | 7-134206 | 5/1995 | |
| JP | 7-314626 | 12/1995 | |
| JP | 9-306366 | 11/1997 | |
| JP | 10-78509 | 3/1998 | |
| JP | 10-105076 | 4/1998 | |
| JP | 11-166826 | 4/1999 | |
| WO | WO97/38855 | 10/1997 | |
| WO | WO99/60430 | 11/1999 | |
| WO | WO 9960430 | 11/1999 | |

* cited by examiner

INFRARED ABSORPTION FILTER

FIELD OF THE INVENTION

The present invention relates to an infrared absorption filter. More particularly, the present invention relates to an infrared absorption filter which contains few foreign materials causing optical defects, has high transmittance in the visible light region, and manifests wide absorption in the near infrared radiation region and intercepts infrared radiation.

DESCRIPTION OF THE RELATED ART

The following filters have been conventionally used as an infrared absorption filter such as a heat ray-absorbing filter or a filter for adjusting the visibility of a video camera:

(1) a filter composed of phosphate glass containing metallic ions such as copper or iron ions (Japanese Unexamined Patent Publication No. 235740/1985, Japanese Unexamined Patent Publication No. 153144/1987, etc.);

(2) an interference filter having plural layers differing from each other in refractive index on a substrate to allow light of specific wavelength to pass by interference of transmitted light (Japanese Unexamined Patent Publication No. 21091/1980, Japanese Unexamined Patent Publication No. 184745/1984, etc.);

(3) an acrylic resin filter composed of a copolymer containing copper ions (Japanese Unexamined Patent Publication No. 324213/1994); and (4) a filter composed of a binder resin and a coloring matter dispersed in the binder resin (Japanese Unexamined Patent Publication No. 21458/1982, Japanese Unexamined Patent Publication No. 198413/1982, Japanese Unexamined Patent Publication No. 43605/1985, etc.).

Also, various materials have been conventionally investigated as a transparent magnetic wave absorption material, and examples thereof include the following materials. Further, a lot of materials combining them have been suggested.

(5) a magnetic wave shielding material composed of textile of conductive fiber;

(6) a magnetic wave shielding material having a mesh structure produced by etching a thin metal plate; and (7) a magnetic wave shielding material composed of a thin film produced from high conductive metals such as silver and the like, and transparent conductive materials such as ITO, $SnO_2$ and the like, using sputtering, vacuum deposition method and the like.

However, the above-mentioned conventional infrared absorption filters have problems as described below.

The filter (1) exhibits sharp absorption in the near-infrared region and can intercept infrared radiation at a very high ratio. However, the filter (1) pronouncedly absorbs part of red color in the visible light region so that the transmitted color looks blue. For display purpose, importance is laid on a color balance. In such purpose, it is unsuitable to use the filter (1). Another problem is raised about the processability of the filter (1) because it is made of glass.

The optical properties of the filter (2) can be freely designed. Further a a filter having properties almost equal to the designed properties can be produced. However, the filter (2) necessitates a plurality of layers differing in refractive index from each other for this purpose, consequently entailing a drawback of incurring high production costs. Moreover, when a large area is required, the filter (2) should have a uniform thickness of high precision over the entire area, resulting in a difficulty in producing the filter.

The filter (3) has improved processablity, a draw back of the filter (1). However, the filter (3) has low degree of freedom in designing optical properties as in the filter (1). Also there remains the problem of the filter (1) that it absorbs part of red color in the visible light region so that the transmitted color looks blue. Further, the absorption of copper ions is low and the amount of copper ions which can be contained an acrylic resin is restricted, causing a problem that the thickness of the acrylic resin has to be increased.

In the filter (4), various infrared-absorbing materials can be used. Examples of useful materials are phthalocyanine, nickel complex, diimmonium salts, azo compounds, polymethines, diphenylmethane, triphenylmethane, quinone and the like. However, when singly used, these materials pose problems of showing insufficient absorption or absorbing a visible light of specific wavelength in the visible light region. Therefore, a plurality of coloring matters are used together. However, when a filter containing a plurality of coloring matters in an infrared absorption layer is left to stand at a high temperature or a high humidity for a long time, the filter causes problems of denaturing a coloring matter due to decomposition and oxidation there of, bringing about absorption in the visible light region, or ceasing absorption in the infrared region, and the like. Further, when these filters comprises a substrate film coated with an infrared absorption layer, there occurs also a problem of deteriorating beam transmission property due to transmittance and haze value of the substrate film.

The above-mentioned problems are not improved even if the above-mentioned infrared absorption filters (1) to (4) are combined with the above-described magnetic wave absorption material (5) to (7).

PDP developed recently as a thin display having a large screen may invite error movement of a remote controller and the like due to near-infrared radiation discharged from the front surface thereof, consequently necessitating setting of an infrared absorption filter which cuts this near-infrared radiation, in front of the screen. However, this infrared radiation shielding filter also does not attain sufficient requirement in the above-mentioned infrared absorption filters, under current condition.

In the filter (4), when a diimmonium salt-based compound is used as an infrared absorption coloring matter, a filter can be obtained which surmounts the above-mentioned problems, provides high absorption in the near-infrared region, and manifests low absorption in the visible region. Further, it can provide an ability also suitable as an infrared absorption filter for PDP.

However, when an foreign material is present in a raw material resin of a substrate film of an infrared absorption filter, molecular orientation of the film is disturbed around this foreign material, in a stretching process in film formation. Resultantly, optical strain occurs, and the foreign material is recognized as a defect larger than the real size, causing remarkable deterioration in grade. For example, even an foreign material having a size of 20 $\mu$m is usually recognized optically as a size of 50 $\mu$m or more, and further, in some cases, it is recognized as an optical defect having a size of 100 $\mu$m or more. For obtaining a film having high transparency, no inclusion of a particle which is used for imparting slipperiness in a substrate film, or an amount of inclusion of a particle as low as possible is preferable. However, when the content of a particle is smaller, transparency of a film tends to increase, and an optical defect due to a fine foreign material tends to more clear. Further, the thickness of a substrate film of this infrared absorption filer is usually 50 μm or more, and the content of foreign material along the thickness direction per unit area of a film tends to larger in such a thick film as compared with a thin film, consequently, further raising this problem.

Moreover, when no particle is contained in a substrate film or the content of a particle is so lowered that transparency is not disturbed for imparting slipperiness in a substrate film, it is usually necessary that particles intending impartment of slipperiness are contained in an easy adhesion layer, and these particles have to be extremely small so as not to cause disturbance of transparency. However, fine particles having lower particle size tends to coagulate extremely, revealing possibility of formation of a coarse coagulated material. If an easy adhesion layer containing this coarse coagulated material is laminated on a substrate film, this coarse coagulated material becomes an optical defect.

SUMMARY OF THE INVENTION

A first object of the present invention is to provide an infrared absorption filter which has absorption in the near-infrared region, manifests high light transmittance in the visible region, does not have large absorption of a specific wavelength in the visible region, and has little optical defect.

Further, an object of the present invention is to provide an infrared absorption filter excellent in environmental stability and durability.

Further, a second object of the present invention is to provide the above-mentioned infrared absorption filter revealing blue gray tone.

The present invention has been completed in view of the above-mentioned conditions, and infrared absorption filters which can solve the above-mentioned problems are as follows.

A first aspect of the present invention is an infrared absorption filter comprising an infrared absorption layer laminated at least on one surface of a transparent polymer film, wherein said transparent polymer film is a film comprising a polymer easy adhesion layer laminated at least on one surface, said transparent polymer film contains substantially no particle, and said transparent polymer film contains foreign materials having a size of 20 μm or more in an amount of 10/m² or less per unit area of the film.

A second aspect of the present invention is an infrared absorption filter according to Invention 1, wherein said infrared absorption filter has a transmittance of at most 30% in the near-infrared region in the wavelength range of 800 to 1100 nm, a difference of 10% or less between a maximum value and a minimum value of transmittance in the visible light region in the wavelength range of 450 to 650 nm, and a transmittance of not lower than 50% at a wavelength of 550 nm.

A third aspect of the present invention is an infrared absorption filter according to Invention 2, wherein said infrared absorption filter has a maximum transmittance of not higher than 30% in the near-infrared region in the wavelength range of 800 to 1100 nm, a difference of 10% or less between a maximum value and a minimum value of transmittance in the visible light region in the wavelength range of 450 to 650 nm, and a transmittance of not lower than 50% at a wavelength of 550 nm, even after being left to stand in the atmosphere at a temperature of 60° C. and a humidity of 95% for 500 hours.

A fourth aspect of the present invention is an infrared absorption filter according to Invention 1, wherein said infrared absorption filter has a transmittance of not higher than 10% in the near-infrared region in the wavelength range of 900 to 1100 nm, a minimum transmittance of not lower than 60% in the visible light regions in the wavelength range of 440 to 500 nm and the wavelength range of 640 to 700 nm, a maximum transmittance of not higher than 60% in the visible light region in the wavelength range of 550 to 600 nm, and a transmittance of not lower than 50% at a wavelength of 550 nm.

A fifth aspect of the present invention is an infrared absorption filter according to Invention 1, wherein said infrared absorption layer comprises an infrared absorption coloring matter and a polymer resin as a main constituent component, and at least two or more selected from the group consisting of diimnonium salt-based compounds, phthalocyanine-based compounds and nickel complex-based compounds are contained as said infrared absorption coloring matter.

A sixth aspect of the present invention is an infrared absorption filter according to Invention 5, wherein at least a diimmonium salt-based compound is contained and at least any one selected from fluorine-containing phthalocyanine-based compounds and nickel complex-based compounds is contained, as said infrared absorption coloring matter.

A seventh aspect of the present invention is an infrared absorption filter according to Invention 5, wherein said diimmonium salt-based compound has a structure of the general formula (1):

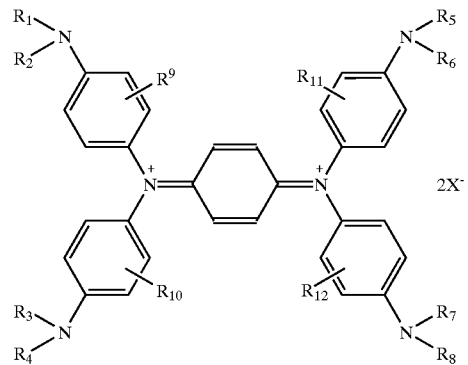

(wherein, $R_1$ to $R_8$ may be the same or different and represent a hydrogen atom, alkyl group, aryl group, alkenyl group, aralkyl group or alkynyl group. $R_9$ to $R_{12}$ may be the same or different and represent a hydrogen atom, halogen atom, amino group, amide group, cyano group, nitro group, carboxyl group or alkyl group. Any of $R_1$ to $R_{12}$ may have a substituent providing it can be bonded to a substituent. $X^-$ represents an anion.).

An eighth aspect of the present invention is an infrared absorption filter according to Invention 5, wherein said phthalocyanine-based compound is a fluorine-containing phthalocyanine-based compound.

A ninth aspect of the present invention is an infrared absorption filter according to any of Invention 5, wherein said nickel complex-based compound has a structure of the general formula (2):

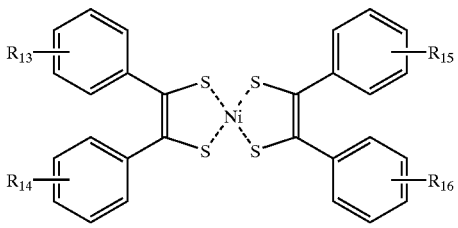

(wherein, $R_{13}$ to $R_{16}$ may be the same or different and represent a hydrogen atom, halogen atom, alkyl group, alkoxy group, aryl group, aralkyl group or amino group.).

A tenth aspect of the present invention is an infrared absorption filter according to any of Invention 5, wherein, regarding the amounts of infrared absorption coloring matters contained in said infrared absorption layer, the compounding ratio of a phthalocyanine-based compound is 0.01 to 1.2 parts by weight and the compounding ratio of a nickel complex-based compound is 0 to 1 part by weight based on 1 part by weight of a diimmonium salt-based compound.

An eleventh aspect of the present invention is an infrared absorption filter according to Invention 5, wherein the glass transition temperature of the polymer resin, a constituent component of said infrared absorption layer is from 85 to 150° C.

A twelfth aspect of the present invention is an infrared absorption filter according to Invention 5, wherein said polymer resin contains a polyester resin as a main component.

A thirteenth aspect of the present invention is an infrared absorption filter according to Invention 12, wherein said polyester resin is a copolymerized polyester resin containing an alicyclic diol component of the general formula (3):

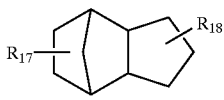

(wherein, $R_{17}$ and $R_{18}$ represent a hydroxyl group and/or a hydroxyalkylene group having 1 to 8 carbon atoms and/or a group obtained by adding 1 to 10 alkylene oxides to a hydroxyalkylene group having 1 to 4 carbon atoms.) in an amount of 60 mol % or more as a polyhydric alcohol component.

A forteenth aspect of the present invention is an infrared absorption filter according to Inventions 1, wherein the amount of a remaining solvent in said infrared absorption layer is 0.05 to 5% by weight.

A fifteenth aspect of the present invention is an infrared absorption filter according to Invention 1, wherein said infrared absorption layer is laminated on the transparent polymer film according to a coating method.

A sixteenth aspect of the present invention is an infrared absorption filter according to Inventions 1, wherein said transparent polymer film is a biaxially stretched polyester film.

A seventeenth aspect of the present invention is an infrared absorption filter according to Invention 1, wherein said polymer easy adhesion layer contains a copolymerized polyester resin and a polyurethane-based resin.

An eighteenth aspect of the present invention is an infrared absorption filter according to Invention 1, wherein the proportion of coarse materials having a maximum diameter of 100 μm or more present on the surface of and/or in said polymer easy adhesion layer is 3/m² or less.

A ninetieth aspect of the present invention is an infrared absorption filter according to Invention 1, wherein said polymer easy adhesion layer,contains a particle.

A twentieth aspect of the present invention is an infrared absorption filter according to Invention 1, wherein said transparent polymer film has a haze value of 1% or less.

A twenty first aspect of the present invention is an infrared absorption filter according to Invention 1, wherein a reflection prevention layer is laminated on the outermost layer of said infrared absorption filter.

A twenty second aspect of the present invention is an infrared absorption filter according to Invention 1, wherein an anti-glare treatment layer is laminated on the outermost layer of said infrared absorption filter.

A twenty third aspect of the present invention is an infrared absorption filter according to Invention 1, which is used as a member of a front plate of a plasma display.

DETAILED DESCRIPTION OF THE PREFERRED EMBODIMENTS

Figure 1:
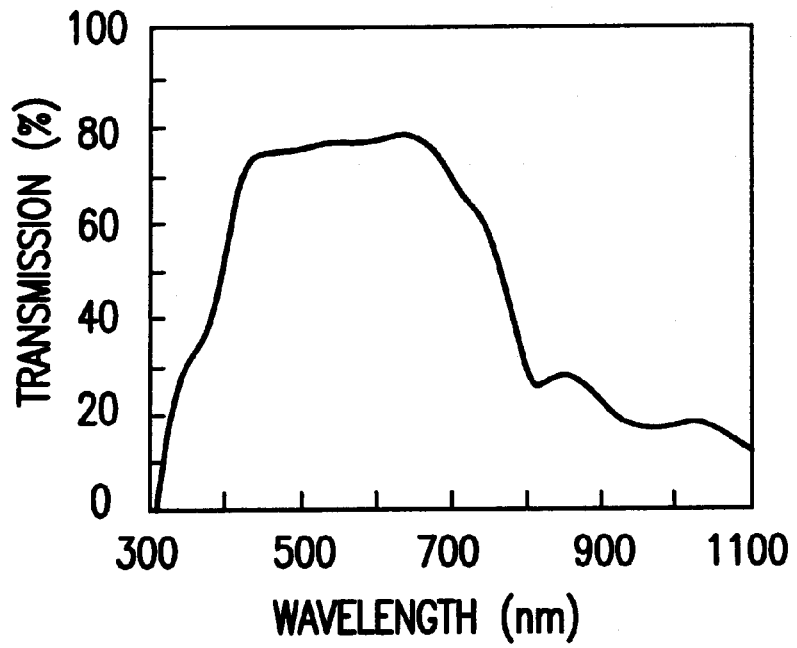
FIG. 1 is an explanation view showing spectral properties of an infrared absorption filter in Example 1.

An infrared absorption filter of the present invention has a constitution in which a transparent polymer film is used as a substrate, an infrared absorption layer is laminated at least on one surface of the substrate, and further, a polymer easy adhesion layer is laminated at least on one surface of the transparent polymer film.

(Constitution of Infrared Absorption Layer)

In an infrared absorption filter of the present invention, an infrared absorption layer comprises an infrared absorption coloring matter and a polymer resin as main constituent components. In the present invention, it is preferable that the infrared absorption coloring matter is dispersed in the polymer resin and the resin is coated at least on one surface of a transparent polymer film, from the standpoints of productivity, processability and cost. In this constitution, it is preferable that a polymer easy adhesion layer is placed between the above-mentioned transparent polymer film and the infrared absorption layer, for improving close adhesion of the substrate transparent polymer film with the infrared absorption layer.

In the present invention, as the infrared absorption coloring matter contained in the infrared absorption layer, at least two or more selected from the group consisting of diimmonium salt-based compounds, phthalocyanine-based compounds and nickel complex-based compounds are preferably used together. Further, it is particularly preferable that at least a diimmoniuin salt-based compound is contained and at least one selected from fluorine-containing phthalocyanine-based compounds and nickel complex-based compounds is contained, as the infrared absorption coloring matter contained in the infrared absorption layer. As the phthalocyanine-based compound and/or the thionickel-based complex compound used in the present invention, preferable are those compensating absorption in the near-infrared region of the above-mentioned diimmonium salt compound. Further, regarding the compounding ratio of the infrared absorption coloring matters, it is suitable that the amount of the phthalocyanine-based compound is 0.01 to. 1.2 parts by weight (preferably, 0.01 to 0.5 parts by weight) and the amount of the nickel complex-based compound is 0 to 1 part by weight based on 1 part by weight of the diimmonium salt-based compound, for obtaining an infrared absorption filter which (1) manifests absorption in the near-infrared region, (2) has high light transmittance in the visible region, and (3) has no large absorption of specific wavelength in the visible region.

As the above-mentioned infrared absorption matter, the following compounds are exemplified. The diimmonium salt compound is not particularly restricted providing it has large absorption in the near-infrared region and has high visible light transmittance, and particularly, those having a structure of the general formula (1):

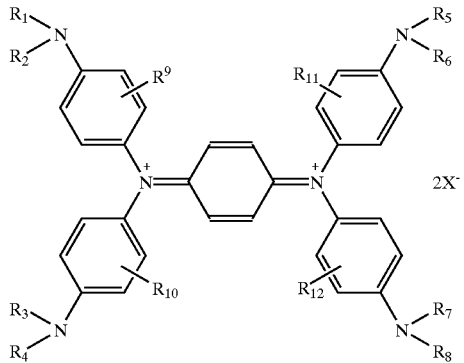

(wherein, $R_1$ to $R_8$ may be the same or different and represent a hydrogen atom, alkyl group, aryl group, alkenyl group, aralkyl group or alkynyl group. $R_9$ to $R_{12}$ may be the same or different and represent a hydrogen atom, halogen atom, amino group, amide group, cyano group, nitro group, carboxyl group or alkyl group. Any of $R_1$ to $R_{12}$ may have a substituent providing it can be bonded to a substituent. $X^-$ represents an anion.) are preferable.

Regarding $R_1$ to $R_8$ in the general formula (1), examples of the alkyl group include a methyl group, ethyl group, n-propyl group, iso-propyl group n-butyl group, iso-butyl group, t-butyl group, n-amyl group, n-hexyl group, n-octyl group, 2-hydroxyethyl group, 2-cyanoethyl group, 3-hydroxypropyl group, 3-cyanopropyl group, methoxyethyl group, ethoxyethyl group, butoxyethyl group and the like. Examples of the aryl group include a phenyl group, fluorophenyl group, chlorophenyl group, tolyl group, diethylaminophenyl group, naphthyl group and the like, and examples of the alkenyl group include a vinyl group, propenyl group, butenyl group, pentenyl group and the like. Further, examples of the aralkyl group include a benzyl group, p-fluorobenzyl group, p-chlorophenyl group, phenylpropyl group, naphthylethyl group and the like.

As $R_9$ to $R_{12}$ in the general formula (1), hydrogen, fluorine, chlorine, bromine, diethylamino group, dimethylamino group, cyano group, nitro group, methyl group, ethyl group, trifluoromethyl group and the like are listed. As $X^-$, a fluorine ion, chlorine ion, bromine ion, iodine ion, perchlorate ion, hexafluoroantimonate ion, hexafluorophosphate ion, tetrafluoroborate ion and the like. However, the scope of the present invention is not limited to the above-mentioned examples.

As the commercially available diimmonium salt-based compound, Kayasorb IRG-022, IRG-023 and the like manufactured by Nippon Kayaku Co., Ltd. are listed.

As the phthalocyanine compound, a fluorine-containing phthalocyanine compound is preferable. As the commercially available phthalocyanine compound, Excolor IR1, IR2, IR3, IR4, TX-EX805K, TX-EX810K, TX-EX811K, TX-EX812K and the like manufactured by Nippon Shokubai Co., Ltd. are listed. Excolor IR1, TX-EX811K are particularly preferable.

As the thionickel complex-based compound, those having a structure of the general formula (2):

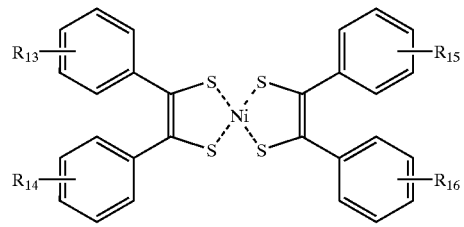

(wherein, $R_{13}$ to $R_{16}$ may be the same or different and represent a hydrogen atom, halogen atom, alkyl group, alkoxy group, aryl group, aralkyl group or amino group.) are preferable.

As the commercially available nickel complex-based compound, SIR-128, SIR-130, SIR-132, SIR-159 and the like manufactured by Mitsui Chemical K. K. are listed, and of them, SIR-128 and SIR-159 are particularly preferable.

Further, a polymer resin is preferably used as a constituent component of the above-mentioned infrared absorption layer, for dispersion of an infrared absorption coloring matter. The kind of the polymer resin is not particularly restricted, and examples thereof include polyester resins, acrylic resins, cellulose resins, polyethylene resins, polypropylene resins, polyolefin resins, polyvinyl chloride resins, polycarbonate resins, phenol resins, urethane resins and the like, and particularly, polyester resins are preferable from the standpoints of dispersion stability, environmental load and the like.

The glass transition temperature of a polymer resin (particularly, polyester resin) which is used as a dispersing medium of an infrared absorption coloring matter is preferably a temperature not lower than the putative guaranteed temperature under environment of use of an infrared absorption filter, for improving weather-resistance from the standpoint of stability of a coloring matter. Since the putative guaranteed temperature of an electronic apparatus is usually 80° C., the glass transition temperature of the polymer resin is preferably 80° C. or more, and more preferably in the range from 85 to 150° C. Further, it is preferably from 85 to 130° C., more preferably from 90 to 110° C.

When the glass transition temperature is less than 85° C., a diimmonium salt compound is denatured as described above. On the other hand, when the glass transition temperature is over 130° C., high temperature should be provided when a polymer resin (particularly, polyester resin) is dissolved in a solvent and coated on a transparent substrate and dried sufficiently, consequently entailing denaturing of a diimmonium salt compound. Also, there occurs deterioration of other infrared absorption coloring matter having weak heat resistance. Further, when dried at lower temperature, the drying time has to be elongated, which causes deterioration in productivity, and a cheap infrared absorption filter can not be made. Also, there is a possibility of insufficient drying.

If the glass transition temperature is in the above-mentioned range coating suitability and durability can be satisfied simultaneously when an infrared absorption layer is laminated on a substrate, transparent polymer film by a coating method. The durability herein referred to means low deterioration in optical property after storage for long time under high temperature and high humidity, for example, after a sample is left for 500 hours under atmosphere of a temperature of 60° C. and a humidity of 95%. Further, there is also a merit that an infrared absorption coloring matter can be dispersed in a polymer resin at high concentration.

A polyester resin preferably used as the above-mentioned polymer resin is synthesized from a polyvalent carboxylic acid component and a polyhydric alcohol component.

Examples of the polyvalent carboxylic acid component constituting a polyester resin include aromatic dicarboxylic acids such as terephthalic acid, isophthalic acid, orthophthalic acid, 1,5-naphtha lenedicarboxylic acid, 2,6-naphthalenedicarboxylic acid, diphenic acid, sulfoterephthalic acid, 5-sulfoisophthalic acid, 4-sulfophthalic acid, 4-sulfonaphthalene-2,7-dicarboxylic acid, 5 C4-sulfophenoxy isophthalic acid, sulfoterephthalic acid and the like and ester forming derivatives thereof; aromatic oxycarboxylic acids such as p-oxybenzoic acid, p-(hydroxyethoxy)benzoic acid and the like and ester forming derivatives thereof; aliphatic dicarboxylic acids such as succinic acid, adipic acid, azelaic acid, sebacic acid, dodecanedicarboxylic acid and the like and ester forming derivatives thereof; unsaturated aliphatic dicarboxylic acids such as fumaric acid, maleic acid, itaconic acid, hexahydrophthalic acid, tetrahydrophthalic acid and the like and ester forming derivatives thereof; alicyclic dicarboxylic acids and ester forming derivatives thereof; and the like. Further, polyvalent carboxylic acids of tri- or more-valent such as trimellitic acid, trimesic acid, pyromellitic acid and the like are also exemplified.

As the polyhydric alcohol component constituting a polyester rein, aliphatic polyhydric alcohols, alicyclic polyhydric alcohols, aromatic polyhydric alcohols and the like are exemplified.

Examples of the aliphatic polyhydric alcohols include aliphatic diols such as ethylene glycol, propylene glycol, 1,3-propanediol, 2,3-butanediol, 1,4-butanediol, 1,5-pentanediol, 1,6-hexanediol, neopentyl glycol, diethylene glycol, dipropylene glycol, 2,2,4-trimethyl-1,3-pentanediol, polyethylene glycol, polypropylene glycol, polytetramethylene glycol and the like; triols and tetraols such as trimethylolethane, trimethylolpropane, glycerin, pentaerythritol and the like.

Examples of the aliphatic polyhydric alcohols include 1,4-cyclohexanediol, 1,4-cyclohexanedimethanol, spiro-glycol, hydrogenated bisphenol A; ethylene oxide adducts or propylene oxide adducts of hydrogenated bisphenol A and the like; tricyclodecanediol, tricyclodecanedimethanol, tricyclodecanediethanol, dimethyltricyclodecanedipropylol, tricyclodecanedibutylol, dimethyltricyclodecanedimethanol, diethyltricyclodecanedimethanol, tetramethylcyclodecanedimethanol, hexamethyltricyclodecanedimethanol, octamethyltricyclodecanedimethanol and the like.

Examples of the aromatic polyhydric alcohols include 9,9-bis-(4-(2-hydroxyethoxy)phenyl)-fluorene, 9,9-bis-(4-(2-hydroxyethoxy)-3-methylphenyl)-fluorene, 9,9-bis-(4-(2-hydroxyethoxy)-3,5-dimethylphenyl)-fluorene, 9,9-bis-(4-(2-hydroxyethoxy)-3-ethylphenyl)-fluorene, 9,9-bis-(4-(2-hydroxyethoxy)-3,5-diethylphenyl)-fluorene, 1,1-bis-(4-(2-hydroxyethoxy)phenyl)-cyclohexane, 1,1-bis-(4-(2-hydroxyethoxy)-3-methylphenyl)-cyclohexane, 1,1-bis-(4-(2-hydroxyethoxy)-3,5-dimethylphenyl)-cyclohexane, 1,1-bis-(4-(2-hydroxyethoxy)-3-ethylphenyl)-cyclohexane, 1,1-bis-(4-(2-hydroxyethoxy)-3,5-diethylphenyl)-cyclohexane p-xylene glycol, methaxylene glycol, orthoxylene glycol, 1,4-phenylene glycol; ethylene oxide adducts of 1,4-phenylene glycol and the like; bisphenol A; ethylene oxide adducts or propylene oxide adducts of bisphenol A, and the like.

Further, there can be exemplified lactone-based polyester polyols obtained by ring-opening-polymerizing lactones such as ε-caprolactone and the like, as the polyester polyol.

Regarding the polyhydric alcohol, is preferable to copolymerize an alicyclic diol component of the general formula (3):

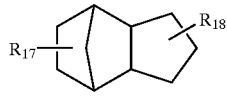

(wherein, $R_{17}$ and $R_{18}$ represent a hydroxyl group and/or a hydroxyalkylene having 1 to 8 carbon atoms and/or a group obtained by adding 1 to 10 alkylene oxides to a hydroxyalkylene group having 1 to 4 carbon atoms.) as the polyhydric alcohol component in an amount of 60 mol % or more with a polyester resin.

Examples the alicyclic diol of the general formula (3) include tricyclodecanedimethylol, tricyclodecanediethylol, tricyclodecanedipropylol, tricyclodecanedibutanol, dimethyltricyclodecanedimethylol and the like. Of them, tricyclodecanedimethylol in which both $R_{17}$ and $R_{18}$ are a methylol group is particularly preferable.

When a filter using a diimmonium salt-based compound is left for a long time under high temperature or high humidity, problems occur of decrease in absorption, manifestation of specific absorption in the visible region and changing into yellow-green color. As the countermeasure against these problems, use of a polyester-based resin having suitably raised glass transition temperature has been suggested. For example, JP-A No. 9-838855 and JP-A No.

11-116826 exemplify a mixture of an infrared absorption coloring matter with a polyester resin obtained by copolymerizing a specific aromatic diol in an amount of 10 mol % or more. However, in the composition range using the above-mentioned aromatic diol, the glass transition temperature increases to the contrary, consequently, when the copolymerized polyester resin is mixed with an infrared absorption coloring matter and a solvent and coated on a substrate film, problems of a longer time required for drying, deterioration in environmental stability due to a remaining solvent because of insufficient drying, and curl of a film after coating and drying occur. Further, some of the above-mentioned copolymerized polyester resin manifest low solubility in a solvent, and can not provide coating suitability.

The present invention has been found to be excellent extremely in solvent-solubility and coating suitability, by copolymerizing an alicyclic diol of the general formula (3) in an amount of 60 mol % or more with a polyester resin.

When the proportion of the alicyclic diol is less than 60 mol %, solvent-solubility is improved and coating becomes easy, while, the glass transition temperature of the copolymerized polyester resin decreases and environmental stability deteriorates when an infrared absorption pigment is mixed. The upper limit of the copolymerization amount of an alicyclic diol of the general formula (3) is preferably less than 95 mol %. When the upper limit is 95 mol % or more, the degree of polymerization of the copolymerized polyester resin does not increase easily, consequently entailing an undesirable tendency of extreme fragileness.

Additionally, in some cases, a mono-functional monomer is introduced into a polyester resin for the purpose of blocking a polar group at the end of the polyester polymer.

As the mono-functional monomer, there can be used mono-carboxylic acids such as benzoic acid, chlorobenzoic acid, bromobenzoic acid; p-hydroxybenzoic acid, mono-ammonium sulfobenzoate, mono-sodium sulfofbenzoate, cyclohexylaminocarbonylbenzoic acid, n-dodecylaminocarbonylbenzoic acid, tertiary-butylbenzoic acid, naphthalenecarboxylic acid, 4-methylbenzoic acid, 3-methylbenzoic acid, salicylic acid, thiosalicylic acid, phenylacetic acid, acetic acid, propionic acid, butyric acid, isobutyric acid, octanecarboxylic acid, laurylic acid, stearylic acid, and lower alkyl esters thereof, and mono-alcohols such as aliphatic alcohol, aromatic alcohol, alicyclic alcohol and the like.

In the present invention, unsaturated monomers among the above-mentioned compounds are used as essential components, and other components are appropriately selected depending on the glass transition temperature of a polyester resin, compatibility with the monomers, and the like.

An infrared absorption filter of the present invention preferably has a remaining solvent amount in an infrared absorption layer of 5% by weight or less. In the case of formation of an infrared absorption layer by a coating method in a solvent system, when the remaining solvent amount is over 5% by weight, the apparent glass transition temperature lowers remarkably even if the layer looks dry and no blocking is found in appearance. Particularly, when a diimmonium salt compound is used as an infrared absorption coloring matter, there is a problem that a diimmonium salt-based coloring matter is denatured and a filter is discolored into yellow-green color when left for a long period of time under high temperature and high humidity.

In the present invention, it is particularly preferable that the remaining solvent amount in an infrared absorption layer is from 0.05 to 3% by weight. If the remaining solvent amount is less than 0.05% by weight, though denaturation of an infrared absorption coloring matter when left for a long time under high temperature and high humidity decreases, the infrared absorption coloring matter tends to be denatured due to heat required for controlling the remaining solvent amount to less than 0.05% by weight.

A remaining solvent amount in an infrared absorption layer of 5% by weight or less can be attained by satisfying drying conditions of the following formulae (4) to (6) simultaneously. Regarding units of factors used in the following formulae (4) to (6), the unit of wind velocity is m/second, the unit of hot air temperature is ° C., the unit of drying time is minute, and the unit of coating thickness is μm.

Wind velocity×(hot air temperature−20)×drying time/coating thickness>48 (4)

Hot air temperature:≧80° C. (5)

Drying time:≧60 seconds (6)

In an infrared absorption filter of the present invention, a UV absorber may be added to an infrared absorption layer for improving light resistance. Further, a polymer resin dispersing an infrared absorption coloring matter may be crosslinked to an infrared absorption layer by using a crosslinking agent, for imparting weather resistance and solvent resistance to an infrared absorption filter of the present invention.

(Raw Material Resin of Transparent Polymer Film)

Examples of the resin constituting a transparent polymer film which is a substrate of an infrared absorption layer of the present invention include, but not particularly restricted to, polyester resins, acrylic resins, cellulose resins, polyethylene resins, polypropylene resins, polyolefin resins, polyvinylchloride resins, polycarbonate resins, phenol resins, urethane resins and the like. Of them, polyester resins such as polyethylene terephthalate, polybutylene terephthalate, polyethylene-2,6-naphthalate and the like are preferable from the standpoints of environmental load, cost performance and the like. Particularly, polyethylene terephthalate (hereinafter, abbreviated as PET) is suitable. Detailed descriptions will be made below using PET as an example.

For producing a PET resin, any of a known direct polymerization method in which terephthalic acid and ethylene glycol are used as starting materials and polycondensed via an esterification reaction and a known transesterification method in which dimethyl terephthalate and ethylene glycol are used as starting materials and polycondensed via a transesterification reaction, can be used. In the case of the direct polymerization method, examples of compounds to be contained in a PET resin include polycondensation catalysts ($Sb_2O_3$, Sb glycolate and the like), heat stabilizers (P-based compounds such as trimethylphosphate and the like), and close adherence improving agents (glycol-soluble alkali metal salts, alkaline earth metal salts and the like)used in producing an un-drawn film using a static electricity application method. In the case of the transesterification method, transesterification reaction catalysts (acetates and the like of Mg, Ca, Zn, Mn and so on) are necessary in addition to the above-mentioned compound. Particularly in the case of use of $Sb_2O_3$ as the polycondensation catalyst, $Sb_2O_3$ is reduced into metal Sb which tends to be deposited as a coagulated material on the surface of a film, in polymerization and/or production of an un-drawn PET film. Since this is one cause of optical defects in the film, it is preferable that the content of $Sb_2O_3$ is reduced to as low level as possible within the range wherein the polycondensation time is not remarkably delayed.

For establishing the content of foreign materials having a size of 20 μm or more in a PET film of 10/m² or less per unit area of the film, the content of $Sb_2O_3$ in the PET resin is preferably from 50 to 250 ppm, further preferably from 50 to 200 ppm, particularly preferably from 70 to 150 ppm, in terms of an Sb element. Though an inert particle and internal deposition particle are contained in the PET resin for the purpose of imparting slipperiness and the like in general, it is necessary these particles are not substantially contained from the standpoints of improvement of transparency and decrease of the above-mentioned foreign materials. Substantially no inclusion of particles means that the content of particles in a film is smaller than the detection limit in analyzing the particles by fluorescent X ray.

Further, it is preferable to filtrate a PET resin through a NASLON (metal fiber, manufactured by Nippon Seisen Stainless Steelwire) filter having a pore size (95% cut) of 7 μm or less after completion of polycondensation, or in extruding a molten resin in the form of a strand into cooling water, to filtrate the cooling water (pore size 1 μm or less) and to reduce the amount of foreign materials having a size of 1 μm or more in a HEPA filter by conducting the filtration in a sealed room, for attaining a content of foreign materials having a size of 20 μm or more in a PET resin, raw material of a substrate film, of 10/m² or less per unit area of the film.

The intrinsic viscosity of a PET resin is preferably in the range from 0.45 to 0.70 dl/g. It is further preferably from 0.50 to 0.67 dl/g, particularly preferably from 0.55 to 0.65 dl/g. If the intrinsic viscosity is less than 0.45 dl/g, breaking frequently occurs, in producing a film and strength and elongation property becomes insufficient. On the other hand, when it is over 0.70 dl/g, filtration pressure rise becomes large and high precision filtration for removing foreign materials becomes difficult undesirably.

(Production of Transparent Polymer Film)

A. Production of Un-drawn Film

A PET resin containing substantially no inert particle and internal deposition particle is dried under vacuum sufficiently, then, fed to an extruder, melt-extruded in the form of a sheet at 280° C., and cooled and solidified to give an un-drawn PET sheet. In this procedure, for further removing foreign materials contained in the PET resin, the above-mentioned high precision filtration is conducted at any place wherein the molten resin is kept at about 280° C. to remove foreign materials contained in the resin.

Though a filtration material used in the high precision filtration of a molten resin is not particularly restricted, a filtration material made of a stainless sintered body is suitable for rendering the content of foreign materials having a size of 20 μm or more such as catalysts and additives in a raw material PET resin, fallen materials from the reaction vessel wall, coarse foreign materials ascribed to outer contaminated substances, and organic substances having high melting point, and the like, to 10/m² or less. It is preferable that the filtration particle size (initial filtration efficiency: 95%) of a filtration material used for the high precision filtration of a molten resin is 15 μm or less. When the filtration particle size of a filtration material is over 15 μm, removal of foreign materials having a size of 20 μm or more tends to be insufficient. High precision filtration of a molten resin using a filtration material having a filtration particle size (initial filtration efficiency: 95%) of 15 μm or less is extremely important to obtain a PET film having little optical defects and having excellent transparency, though productivity thereof may lower sometimes.

Even in the case of fine foreign materials passing through a filtration material in an extrusion process of a molten resin, crystallization progresses around the foreign materials in a process of cooling a molten material in the form of a sheet, this causes ununiformity of drawing in a drawing process, and a minute difference in thickness is generated, leading to lens condition. In parts containing this minute different in thickness, light is reflected or scattered as if there is a lens, and foreign materials look larger than the real size when observed with naked eyes. This minute difference in thickness can be observed as a difference between the height of a convex part and the depth of a concave part, and when the height of a convex part is 1 μm or more and the height of a concave part adjacent to the convex part is 0.5 μm or more, even a material having a size of 20 μm is recognized by naked eyes as a material having a size of 50 μm or more, further in some cases, recognized as an optical defect having a size of 100 μm or more. For obtaining a transparent film used in the present invention, it is preferable that a substrate film contains substantially no particle for imparting slipperiness, however, when transparency is higher, an optical defect due to minute unevenness tends to become more clear. Further, a thick film is not quenched and tends to manifest development of crystallization as compared with a thin film therefore, it is necessary to quench the whole film in producing an un-drawn film.

For cooling an un-drawn film, there can be applied a known method in which a molten resin is extruded in the form of a sheet via a die onto a rotation cooling drum, and the sheet form molten material is quenched to give a sheet while contacting closely with the rotation cooling drum, according to a static electricity applying close contact method. As a method for quenching the air surface (opposite surface to the surface contacting with a quenching drum) of this sheet, a method of quenching by blowing a high speed airflow.

B. Production of Drawn Film

A transparent polymer film which is used as a substrate of an infrared absorption filter of the present invention is preferably a film drawn at least along one axial direction, and particularly preferably a biaxially drawn film. A biaxially drawn film is produced under the following conditions.

The resulted un-drawn film is drawn at a magnification of 2.5 to 5.0 along the longitudinal direction by rolls heated to 80 to 120° C., to obtain a monoaxially oriented PET film. Further, the end of the film was grasped with a clip, introduced into a hot air zone heated to 80 to 180° C., dried, then drawn at a magnification of 2.5 to 5.0 along the cross direction. Subsequently, it is introduced into a heat treatment zone at 200 to 240° C., and heat-treated for 1 to 60 seconds, to complete crystal orientation. In this heat treatment process, relaxation treatment of 3 to 10% along cross direction and/or longitudinal direction may be performed, if necessary.

C. Lamination of Polymer Easy Adhesion Layer

In the present invention, it is necessary that a polymer easy adhesion layer is laminated at least on one surface of a transparent polymer film. For forming the polymer easy adhesion layer, it is preferable that a coating solution of a polymer easy adhesion resin comprising a water-soluble or water-dispersible resin is coated and dried for lamination at least on one surface of a PET film, in any stage of the above-mentioned film production process.

A process of coating the above-mentioned aqueous coating solution may be a usual coating process, namely, a process in which the solution is coated on a substrate film which has been biaxially drawn and heat-fixed, however, an inline coating method in which coating is conducted in the production process of the film is preferable. More preferably, the solution is coated on a substrate film before completion of crystal orientation. It is effective, for reducing foreign materials adhering to the surface of a film, to control the degree of cleanness in air (number of particles of 0.5 $\mu$m or more/ft$^3$) from manufacturing of an un-drawn film to a coating process to class 100,000 by a HEPA filter.

When the above-mentioned coating solution is coated on an un-drawn or mono-axially drawn polyester film substrate, then, dried and drawn, it is important to remove only solvent parts such as water and the like and to select temperature and time which dot not provide progress of a crosslinking reaction of a coated layer. The drying temperature is preferably conducted at 70 to 140° C., the drying time is controlled depending on a coating solution and the coating amount, and the product of the temperature (° C.) and the time (sec.) is preferably 3000 or less.

The solid concentration in an aqueous coating solution is preferably 30% by weight or less, particularly preferably 10% by weight or less. A film on which the aqueous coating solution has been coated and dried is introduced into a tenter for drawing and heat-fixing, heated therein, and a stable film is formed by a thermal crosslinking reaction to give a polyester-based laminated film. For obtaining excellent close adherence with ink, it is preferable that the solution is heated at 100° C. or more for 1 minute or more in a heat treatment process and the coating amount of a easy adhesion layer after the heat treatment is 0.05 g/m$^2$ or more.

Coating of the above-mentioned aqueous coating solution can be conducted by a known method. For example, there are listed a reverse roll coating method, gravure coating method, kiss coating method, roll brushing method, spray coating method, air knife coating method, wire bar coating method, pipe doctor method, impregnation coating method, curtain coating method and the like, and these may be used alone or in combination.

The polymer easy adhesion resin laminated on a transparent polymer film of the present invention is not particularly restricted, and for example; aqueous polyester resins, aqueous polyurethane resins, aqueous acrylic resins, acrylic acid graft type polyester resins, maleic acid graft type polyester resins the like are listed. Among them, a polymer resin comprising the above-mentioned copolymerized polyester-based resin (A) and polyurethane resin (B) as main constituent components is excellent in adhesion with a substrate PET film and an infrared absorption layer, and also excellent in adhesion with a reflection preventing layer and an anti-glare treatment layer laminated on the outermost layer of an infrared absorption filter, further, has high transparency, suitably. Therefore, it is preferable to provide the above-mentioned polymer easy adhesion layer, particularly a easy adhesion layer composed of a polymer resin comprising the copolymerized polyester-based resin and polyurethane resin as main constituent components, on the surface of a substrate PET film on which an infrared absorption layer is laminated, and on the surface of a substrate PET film on which a reflection prevention layer and an anti-glare treatment layer are laminated.

When a copolymerized polyester-based resin is used alone as a polymer resin constituting the polymer easy adhesion layer, though the adhesion with a substrate PET film is sufficient, adhesion is insufficient when a reflection prevention layer and anti-glare treatment layer laminated on the outermost layer of an infrared absorption filer, and an infrared absorption layer are coated with a solvent system.

Moreover, when a polyurethan-based resin is used alone, adhesion with a substrate PET film, and an infrared absorption layer is inferior.

The copolymerized polyester-based resin, constituent component of the above-mentioned polymer easy adhesion layer contains a branched glycol component as a constituent component. Examples of the branched glycol component include 2,2-dimethyl-1,3-propanediol, 2-methyl-2-ethyl-1,3-propanediol, 2-methyl-2-butyl-1,3-propanediol, 2-methyl-2-propyl-1,3-propanediol, 2-methyl-2-isopropyl-1,3-propanediol, 2-methyl-2-n-hexyl-1,3-propanediol, 2,2-diethyl-1,3-propanediol, 2-ethyl-2-n-butyl-1,3-propaneidol, 2-ethyl-2-n-hexyl-1,3-propanediol, 2,2-di-n-butyl-1,3-propanediol, 2-n-butyl-2-propyl-1,3-propanediol, 2,2-di-n-hexyl-1,3-propanediol and the like.

The above-described branched glycol components is contained in a proportion of 10 mol % or more, further preferably of 20 mol % or more in the whole glycol component. As the glycol component other than the above-mentioned compounds, ethylene glycol is most preferable. If used in small amount, diethylene glycol, propylene glycol, butanediol, hexanediol, or 1,4-cyclohexanedimethanol and the like may be also be used.

As the dicarboxylic acid component, constituent component of the above-mentioned copolymerized polyester-based resin, terephthalic acid and isophthalic acid is most preferable. If used in small amount, other dicarboxylic acids, for example, aromatic dicarboxylic acids such as diphenylcarboxylic acid, 2,6-naphthalenedicarboxylic acid and the like may also be, added and copolymerized.

As the other acid components than the above-mentioned dicarboxylic acid component, for example, 5-sulfoisophthalic acid, 4-sulfoisonaphthalene-2,7-dicarboxylic acid 5-(4-sulfophenoxy)isophthalic acid, is useable to providing a water dispesibility. The above components is preferably contained in a proportion of 1 to 10 mol % in the whole glycol component.

The urethan resin, the other components of easy adhesion layer, for example, are heat reaction type water-soluble urethane and the like which contain a blocked isocyanate group and in which the end isocyanate group has blocked with a hydrophilic group. As the blocking agent for the isocyanate group, there are listed bisulfites, and phenols, alcohols, lactams, oximes and active methylene compounds containing a sulfonic group, and the like. The blocked isocyante group hydrophilizates or water-solubilizes a urethane prepolymer. When heat energy is given to the above-mentioned resin in a drying or heat set process in producing a film, a blocking agent is detached from an isocyanate group, consequently, the above-mentioned resin fixes a water-dispersible copolymerized polyester resin mixed into self-crosslinked network, and reacts together with the end group and the like of the resin. A resin in preparing a coating solution has poor water resistance since the resin is hydrophilic, however, when a thermal reaction is completer after coating, drying, and heat set, a hydrophilic group of a urethane resin, namely, a blocking agent is removed, resultantly, a coated film having excellent water resistance is obtained. Among the above-mentioned blocking agents, bisulfites are most preferable as agents having appropriate heat treatment temperature and heat treatment time and used industrially most widely.

The urethan prepolymer used in the above-mentioned resin is a compound having an end isocyanate group, obtained by reacting (a) a compound having a molecular weight of 200 to 20,000 and containing two or more active hydrogen atoms in the molecule and (2) an organic polyisocyanate containing two or more isocyanate groups in the molecule, or if necessary, (3) a compound (chain extender) containing at least two active hydrogen atoms in the molecule in addition to (1) and (2).

The compound generally known as the compound (1) is a compound containing two or more hydroxyl groups, carboxyl groups, amino groups or mercapto groups at the end or in the molecule, and as the preferable compounds, polyether polyol, polyether ester polyol and the like are listed.

As the polyether polyol, there are listed, for example, compounds obtained by polymerizing alkylene oxides such as ethylene oxide, propylene oxide and the like, or styrene oxide and epichlorohydrin and the like, or compounds obtained by conducting random polymerization or block polymerization thereof or addition polymerization to polyhydric alcohol. As the polyester polyol and polyether ester polyol, linear or branched compounds are mainly listed. These polyols can be obtained by condensing saturated or unsaturated polyvalent carboxylic acids such as succinic acid, adipic acid, phthalic acid, maleic anhydride and the like or carboxylic anhydrides thereof, with saturated and unsaturated polyhydric alcohols such as ethylene glycol, diethylene glycol, 1,4-butanediol, neopentyl glycol, 1,6-hexanediol, trimethylolpropane and the like, polyalkylene ether glycols such as polyethylene glycol and polypropylene glycol and the like having relatively lower molecular weight, or mixtures of these alcohols.

Further, as the polyester polyol, polyesters obtained from lactone and hydroxy acid can be used, and as the polyether ester polyol, polyether esters obtained by adding ethylene oxide or propylene oxide to polyesters previously produced can also be used.

As the above-mentioned organic polyisocyanate (2), there are listed, isomers of toluene diisocyanate, aromatic diisocyanates such as 4,4-diphenylmethane dissocyanate and the like, aromatic aliphatic diisocyanates such as xylylene diisocyanate and the like, alicyclic diisocyanates such as isophorone diisocyanate, 4,4-dicyclohexylmethane diisocyanate and the like, aliphatic diisocyanates such as hexamethylene diisocyanate, 2,2,4-trimethylhexamethylene diisocyanate and the like, or polyisocyanates obtained by using these compounds alone or in combination and by previously adding trimethylolpropane and the like.

As the above-described chain extender (3) containing at least two active hydrogen atoms, there are listed glycols such as ethylene glycol, diethylene glycol, 1,4-butanediol, 1,6-hexanediol and the like, polyhydric alcohols such as glycerin, trimethylolpropane, pentaerythritol, and the like, diamines such as ethylenediamine, hexamethylenediamine and piperazine and the like, amino alcohols such as monoethanolamine, diethanolamine and the like, thiodiglycols such as thiodiethylene glycol and the like, or water. In synthesizing the above-mentioned urethane polymer (3), materials are reacted at a temperature of 150° C. or less, preferably from 70 to 120° C. for 5 minutes to several hours, usually by a one-stage or multi-stage isocyanate polyaddition method. The ratio of an isocyanate group to an active hydrogen atom can be freely selected providing it is within 1, and it is necessary that a free isocyanate group remains in the resulting urethane prepolymer.

Further, the content of a free isocyanate group may advantageously be 10% by weight or less, and it is preferably 7% by weight or less in view of stability of a urethane polymer aqueous solution after being blocked. The above-mentioned resulted urethane prepolymer is blocked preferably using a bisulfite salt. The prepolymer is mixed with an aqueous solution of a bisulfite salt, and the reaction is progressed for 5 minutes to 1 hour while stirring. The reaction temperature is preferably 60° C. or less. Then, the reaction solution is diluted with water to a suitable concentration, to give a heat-reaction type water-soluble urethane composition. The composition is controlled to a suitable concentration and viscosity in use, however, when it is heated around 80 to 200° C., usually, a blocking agent, bisulfite is dissociated, and an active isocyanate group is reproduced, consequently, a polyurethane polymer is produced by a polyaddition reaction occurring in the molecule or between molecules of a prepolymer, or, a nature occurs which causes addition to other functional group.

As the above-mentioned polyurethane resin (B) containing a blocked isocyanate group, Elastron: trade name, manufactures by Dai-ichi Kogyo Seiyaku Co., Ltd. is exemplified. Elastron is a compound in which an isocyanate group has been blocked by a sodium bisulfite, and is water-soluble because of the presence of a carbamolyl sulfonate group having strong hydrophilicity at the end of the molecule.

When a coating solution is prepared by mixing the copolymrized polyester resin (A) containing a branched glycol component and the polyurethane resin (B) containing a blocked isocyanate group used in the present invention, the weight ratio of the resin (A) to the resin (B) is preferably from 90:10 to 10:90, further preferably from 80:20 to 20:80. When the weight ratio of the above-mentioned resin (A) to the total solid weight in an easy adhesion layer is less than 10%, coatability to a substrate film tends to become insufficient, and adhesion between a polymer adhesion layer and a substrate film tends to become insufficient. On the other hand, when the weight ratio of the above-mentioned resin (B) to the total solid weight in an easy adhesion layer is less than 10%, practical adhesion is not obtained easily in a hard coat of UV curing type.

In an aqueous coating solution used in the present invention, a catalyst may advantageously be added for promoting a thermal crosslinking reaction, and for example, various chemical substances such as inorganic substances, salts, organic substances, alkaline substances, acidic substances, metal-containing organic compounds and the like can be used. Further, for controlling pH of an aqueous solution, an alkaline substance or acidic substance may also be added.

In coating the above-mentioned aqueous coating solution on the surface of a substrate film, a known anionic active agent and nonionic surfactant can be used in necessary amount for improving wetting to the substrate film and coating the coating solution uniformly. In the solvent used in the coating solution, alcohols such as ethanol, isopropyl alcohol, benzyl alcohol and the like can be mixed in a proportion of up to 50% by weight based on the total amount of the coating solution, in addition to water. Further, when the proportion is less than 10% by weight, organic solvents other than alcohols may be mixed in an amount at which solution thereof is possible. However, the total amount of alcohols and other organic solvents should be less than 50% by weight, in the coating solution.

When the addition amount of an organic solvent is less than 50% by weight, drying property is improved in coating and drying, and an effect of improvement of appearance of a coated film is obtained as compared with the case of use of only water. When the amount is over 50% by weight, evaporation speed of a solvent is high and the concentration of a coating solution changes in a coating process, and viscosity increases leading to decrease in coatability, consequently, there is a fear of occurrence of poor appearance of a coated film, further, crisis such as fire and the like may also be envisaged.

In the present invention, since a particle intending impartment of slipperiness and the like is not contained in a substrate film, it is preferable that the above-mentioned aqueous coating solution contains a particle to form a suitable projection on the surface of a easy adhesion layer from the standpoints of handling properties (slipperiness, winding property, blocking resistance), abrasion resistance, scratch resistance and the like. Examples of such a particle include inorganic particles such as calcium carbonate, calcium phosphate, silica, kaolin, talc, titanium dioxide, alumina, barium sulfate, calcium fluoride, lithium fluoride, zeolite, molybdenum sulfide and the like, organic particles such as crosslinked polymer particles, calcium oxalate and the like. Among them, a silica particle is most suitable since it has relatively similar refractive index to that of a polyester resin and can provide a film having high transparency.

The average particle size of the above-mentioned particle contained in an aqueous coating solution is preferably from 0.01 to 1.0 $\mu$m, particularly preferably from 0.03 to 0.5 $\mu$m. When the average particle size is over 1.0 $\mu$m, the film surface tends to be roughened and transparency of a film tends to decrease. On the other hand, when the average particle size is less than 0.01 $\mu$m, slipperiness, winding property, blocking property and the like of a film tend to become insufficient.

Further, the content of the above-mentioned particle in an easy adhesion layer is preferably from 0.01 to 60% by weight, more preferably, from 0.05 to 30% by weight, further preferably from 0.1 to 10% by weight. When the content of the particle in an easy adhesion layer is over 60% by weight, transparency of a film tends to deteriorate, further, easy adhesion may be lost. On the other hand, when the content of the particle in an easy adhesion layer is less than 0.01% by weight, slipperiness, winding property, blocking property and the like of a film tend to become insufficient.

Two or more of the above-mentioned particles may be compounded in an easy adhesion layer, or particles of the same kind having different particle sizes may also be used together. In any case, it is preferable that the average particle size of the whole particles, and the total content thereof satisfy the above-mentioned ranges.

In coating the above-mentioned coating solution, it is preferable that a filtration material is so placed as to provide precise filtration of a coating solution directly before coating, to remove a coarse coagulated material of particles in a coating solution.

A filtration particle size of a filtration material used for precision filtration of a coating solution used in the present invention of 25 $\mu$m or less (initial filtration efficiency: 95%) is suitable for rendering the proportion of coarse materials having a maximum diameter of 100 $\mu$m or more present on the surface of and/or in a polymer easy adhesion layer to 3/m$^2$ or less per unit area of the polymer easy adhesion layer. When the filtration particle size of a filtration materials is 25 $\mu$m or more, coarse coagulated materials can not be removed sufficiently, and a lot of coarse coagulated materials which can not be removed is coated and dried, then, spread by drawing stress in conducting mono-axial drawing or biaxial drawing of an easy adhesion layer, and recognized as a coagulated material having a sized of 100 $\mu$m or more, and resultantly, a lot of optical defects tend to occur.

The type of a filtration material used for precision filtration of a coating solution is not particularly restricted providing it has the above-mentioned abilities, and for example, filament type, felt type and mesh type are suitable. The material of a filtration material used for precision filtration of a coating solution is not particularly restricted providing it has an ability to removed the above-mentioned coarse coagulated materials and it does not exert a reverse influence on the coating solution, and for example, materials such as stainless, polyethylene, polypropylene, nylon and the like are suitable.

In the above-mentioned aqueous coating solution, various additives such as an antistatic agent, ultraviolet absorption preventing agent, plasticizer, antibacterial agent, pigment, lubricant and the like may also be mixed in addition to particles, in an amount within the range wherein easy adhesion and transparency are not disturbed.

The thickness of the resultant transparent polymer film having an easy adhesion layer is preferably from 50 to 300 $\mu$m, particularly preferably from 100 to 250 $\mu$m. When the thickness of the film is less than 50 $\mu$m, rigidity becomes insufficient, undesirably. On the other hand, when the film thickness is over 300 $\mu$m, foreign materials causing an optical defect present in the film increase and reduce the total beam transparency, undesirably.

Further, the amount of foreign materials having a size of 20 $\mu$m or more in the above-mentioned transparent polymer film having an easy adhesion layer is required to be 10/m$^2$ or less, preferably 8/m$^2$ or less, particularly preferably 6/m$^2$ or less, per unit area. When the amount of foreign materials having a size of 20 $\mu$m or more is over 10/m$^2$, haze value of the whole film increases, and reduction in the total beam transparency occurs. Further, an optical defect also occurs, therefore, an infrared absorption film containing such amount of foreign materials is not preferable.

For rendering the amount of foreign materials having a size of 20 $\mu$m or more to 10/m$^2$ or less, the following methods are suitable when a PET resin is used for example as a film raw material, as described above.

(1) The content of $Sb_2O_3$, polycondensation catalyst in producing PET is decreased lower than the usual amount (it is preferably from 50 to 250 ppm, further preferably from 50 to 200 ppm, particularly preferably from 70 to 150 ppm in terms of an Sb element, based on PET.).

(2) Substantially no inclusion of an inert particle and an internal deposition particle.

(3) A PET resin is filtrated through a NASLON filter having a pore size (95% cut) of 5 $\mu$m or less after completion of polycondensation, or in extruding a molten resin in the form of a strand into cooling water, the cooling water is previously filtrated (pore size; 1 $\mu$m or less), and this process is partitioned and foreign materials having a size of 1 $\mu$m or more in environment are removed by a HEPA filter.

(4) A molten PET resin is subjected to high precision filtration (filtration particle size at the initial filtration efficiency of a filtration material of 95%: ≦15 $\mu$m) in an extrusion process in producing a PET film.

A transparent polymer film which is used as a substrate filter of an infrared absorption filter of the present invention has a haze value preferably of 1% or less. It is further preferably 0.8% or less, particularly preferably 0.6% or less. When the haze value is over 1%, the distinction of a screen of a display using an infrared absorption filter using this transparent polymer film as a substrate decreases, undesirably. For obtaining a haze value of 1% or less, it is effective that the above-mentioned film contains substantially no inert particle and internal deposition particle, and the above-mentioned means for removing coarse foreign materials is adopted, further, a polymer resin containing a copolymerized polyester-based resin and a polyurethane as main constituent components is used as a resin constituting a polymer easy adhesion layer.

(Production of Infrared Absorption Filter)

An infrared absorption layer is laminated on a film prepared by laminating a polymer easy adhesion layer at least on one surface of a transparent polymer film obtained in the above-mentioned process. Lamination of an infrared absorption layer may be effected on an easy adhesion surface of a transparent polymer film, or on a surface carrying no easy adhesion layer.

However, in the case of production of an infrared radiation filter in which an infrared absorption layer is laminated on both surfaces of a transparent polymer film, the filter can not be wound easily in the form of a roll in mass production since the both sides of the film are smooth due to the infrared absorption layer. Therefore, it is preferable to improve handling properties such as slipperiness, winding, blocking property and the like by allowing at least one surface of the above-mentioned infrared absorption layer to contain an inert particle and forming unevenness on the surface of the infrared absorption layer. The inert particle is preferably mixed in a polymer resin in which an infrared absorption coloring matter is dispersed. As the inert particle, fine particles of metal oxides such as silica, alumina and the like, and fluorine-based resins, acrylic resins and polyester-based resins having an average particle size of 0.01 to 0.1 $\mu$m which is shorter than the wavelength of visible light can be used from the standpoint of transparency.

When an infrared absorption layer is laminated at least on one surface of a substrate, transparent polymer film, it is preferable that a polymer resin is dissolved by a solvent such as methyl ethyl ketone, tetrahydrofuran, toluene and the like, then, a coating solution containing a dispersed infrared absorption coloring matter is coated and dried on at least one surface of the substrate film.

An infrared absorption filter of the present invention has an infrared absorption layer comprising an infrared absorption coloring matter and a polymer resin as main constituent components. The infrared absorption filter may be one using an infrared absorption layer singly, or may be one obtained by laminating an infrared absorption layer by a co-extrusion method or a coating method on a transparent substrate. Among them, a coating method is preferable in which an infrared absorption coloring matter is dispersed in a polymer resin and a solvent, and this coating solution is coated and dried on a transparent substrate. By laminating an infrared absorption layer on a transparent substrate by using a coating method, production of an infrared absorption filter becomes easy, and production of small lot is also possible.

When an infrared absorption layer is coated on both surfaces of a substrate film, the method is not particularly restricted, and one example thereof is as follows. For example, there are listed a method in which, by providing a plurality of coater heads on one coating line, both surfaces are coated simultaneously and dried simultaneously, a method in which one surface is first and dried, then, the rear surface is coated and dried.

In an infrared absorption filter of the present invention, it is preferable to laminate a metal mesh conductive layer on the same side as an infrared absorption layer or the opposite side thereof. By lamination of a metal mesh conductive layer, a harmful magnetic wave discharged from a display can be removed.

As the metal mesh conductive layer, a mesh layer obtained by performing etching treatment on a metal foil having high electric conductivity, a mesh layer in the form of a knitted substance using metal fiber, and fiber obtained by adhering a metal on the surface of polymer fiber by using means such as plating and the like, may also be used.

The hole area ratio of a metal mesh used in the above-mentioned magnetic wave absorption layer is preferably 50% or more in view of display use. The metal used in the above-mentioned magnetic wave absorption layer may be any metal and is not particularly restricted providing it has high electric conductivity and has excellent stability. Preferably, copper, nickel, tungsten and the like are recommendable from the standpoints of processability, cost and the like.

In an infrared absorption filter of the present invention, a hard coat treatment layer (HC) may be provided on the outermost layer for improving scratch resistance. As this hard coat treatment layer (HC), crosslinkable resin curing substance layers composed of curing resins such as polyester resins, urethane resins, acrylic resins, melamine resins, epoxy resins, silicon resins, polyimide resins and the like alone, or mixture thereof, are preferable.

The thickness of this hard coat treatment layer (HC) is preferably from 1 to 50 $\mu$m, further preferably from 2 to 30 $\mu$m. When the thickness is smaller than 1 $\mu$m, scratch resistance becomes insufficient, and when over 50 $\mu$m, the coating velocity of a resin for a hard coat remarkably decreases, leading to undesirable productivity.

As the method for laminating a hard coat treatment layer (HC), a method is preferable in which the above-mentioned resin is coated by a gravure method, reverse method, die method and the like on the opposite surface to a surface of a transparent polymer film on which an infrared absorption layer has been provided, then, the resin is cured by applying energy such as heat, ultraviolet radiation, electron beam and the like.

Further, in an infrared absorption filter of the present invention, an anti-glare treatment layer (AG) may also be provided on the outermost layer for improving visibility when applied to a plasma display and the like. The anti-glare treatment layer (AG) can be produced by coating and drying a curing resin, then, forming unevenness on the surface thereof by an emboss roll, thereafter, curing the resin by applying energy such as heat, ultraviolet radiation, electron beam and the like. As the above-mentioned curing resins, polyester resins, urethane resins, acrylic resins, melamine resins, epoxy resins, silicon resins, polyimide resins and the like alone or mixtures thereof are preferable.

Moreover, for further improving the transmittance of visible light when an infrared absorption filter of the present invention is applied to a display, a reflection preventing treatment layer (AR) may also be provided on the outermost layer. On this reflection preventing treatment layer (AR), materials having a refractive index differing from that of a plastic film are preferably laminated as a single layer or two or more layers. In the case of a single layer structure, a material having a refractive index smaller than that of a plastic film may advantageously, be used. In the case of a two or more multiplayer structure, it is preferable that a material having a refractive index larger than that of a plastic film is used in a layer adjacent to the plastic film, and a material having a refractive index smaller than this is selected in a layer placed on the above-mentioned layer. The material constituting such a reflection preventing treatment layer (AR) is not particularly restricted providing is satisfied the above-mentioned relation of refractive index even if it is an organic material or an inorganic material, and for example, dielectric substances composed of $CaF_2$, $MgF_2$, $NaAlF_4$, $SiO_2$, $ThF_4$, $ZrO_2$, $Nd_2O_3$, $SnO_2$, $TiO_2$, $CeO_2$, $ZnS$, $In_2O_3$ and the like are preferably used.

The method of lamination of this reflection preventing treatment layer (AR) may be a dry coating process such as a vacuum deposition method, sputtering method, CVD method, ion plating method and the like, or a wet coating process such as a gravure method, reverse method, die method and the like.

Further, prior to lamination of this hard coat treatment layer (HC), anti-glare treatment layer (AG), reflection preventing treatment layer (AR), known treatments such as corona discharge treatment, plasma treatment, sputtering etching method, electron beam irradiation treatment, ultraviolet irradiation treatment, primer treatment, easy adhesion treatment and the like may also be performed as a previous treatment.

An infrared absorption filter of the present invention contains little foreign materials in a substrate film and has little optical defect. An infrared absorption filter of the present invention has a maximum value of a transmittance in the near-infrared region in the wavelength range of 800 nm to 1100 nm of 30% or less, and has a difference between a maximum value and a minimum value of a transmittance in the visible region in the wavelength range of 450 nm to 650 nm of 10% or less, further, can satisfy a transmittance at a wavelength of 550 nm of 50% or more, manifest absorption in the near-infrared region, has high beam transmittance in the visible region, and does not have large absorption of specific wavelength in the visible region and shows dark gray tone. Further, even after left for 500 hours in an atmosphere of a temperature of 60° C. and a humidity of 95%, it can satisfy the above-mentioned transmittance, and is excellent in environmental stability. Further, an infrared absorption filter of the present invention has a transmittance in the near-infrared region in the wavelength range of 900 to 1100 nm of 10% or less. Owing to such low transmittance in the near-infrared region, when applied to a plasma display and the like, the filter can absorb unnecessary infrared radiation radiated from the display, and can prevent malfunction of a remote controller using infrared radiation.

Further, an infrared absorption filter of the present invention can have a minimum transmittance in the visible regions of the wavelength range of 440 to 500 nm and 640 to 700 nm of 60% or more, and a maximum transmittance in the visible region in the wavelength range of 550 to 600 nm of 60% or less. When the spectral property of the infrared absorption filter is within the above-mentioned range, tone is blue-gray, and when plated in front of the display, matching with color generated from the display is excellent. Particularly in the case of a plasma display, since the emission strength of blue color is weaker as compared with green color and red color, the transmittance in the visible region in the wavelength range of 540 to 600 nm has to be decreases, for correcting the emission strength. Further, the transmittance at a wavelength of 550 nm is preferably 50% or more. When this transmittance at this wavelength is 50% or less, when a filter having the above-mentioned spectral property is placed in front of the display, the display becomes very dark, undesirably. Such an infrared absorption filter of the present invention is suitable for a filter for preventing malfunction of a remote controller of a plasma display panel (PDP), liquid crystal display (LCD), car navigation system and the like, and for a filter for correcting luminosity of a video camera, heat ray absorption filter and the like, since it has blue-gray tone.

EXAMPLES

The following examples illustrate a method for producing an infrared absorption filter of the present invention below, but do not limit the scope of the present invention. "Parts" used in examples and comparative examples means "parts by weight" unless otherwise stated. Further, specific values used in the instant specification were evaluated according to the following methods.

(1) Intrinsic Viscosity of Polyester Resin

It was measured from the solution viscosity at 30° C. in a mixed solvent of 1,1,2,2-tetrachloroethane/phenol (ratio by weight: 2/3).

(2) Adhesion with Optical Curing Type Acrylic Coated Layer

On an easy adhesion layer surface of a film obtained in examples and comparative examples, a hard coat agent manufactured by Dainichiseika Colour & Chemicals Mfg. Co. Ltd. (Seika Beam EXF01(B)) was coated by using a #8 wire bar, dried at 70° C. for 1 minute, a solvent was removed, then, a hard coat layer having a thickness of 3 $\mu$m was formed under conditions of 200 mJ/cm$^2$, an irradiation distance of 15 cm and a transportation speed of 5 m/min. using a high pressure mercury lamp. The resulted film was subjected to a test according to JIS-K5400, 8.5.1, to measure adhesion.

Specifically, 100 lattice cuts reaching through the easy adhesion layer to the substrate film were made using a cutter guide having an aperture distance of 2 mm. Then, a cellophane adhesive tape (No. 405, manufactured by Nichiban Co., Ltd.; 24 mm width) was pasted to the lattice cut surface, allowed to be adhered completely by rubbing with an eraser, then, peeled to vertical direction, and the number of lattice patterns remaining on the surface of the easy adhesion layer were counted by naked eyes, and adhesion was calculated according to the following formula. Lattice patterns on which the hard coat layer remained partially were excluded from the number of lattice patterns remaining on the surface of the easy adhesion layer.

Adhesion (%)=(number of lattice patterns remaining/number of initial lattice patterns)×100

(3) Size of Foreign Material in Film and Coarse Coagulated Material in Coating Solution 16 film pieces of 250 mm×250 mm were applied to an optical defect detecting apparatus described below, to detect optical defects optically recognized to have a size of 50 $\mu$m or more.

(Detection Theory of Optical Defect)

A fluorescent lamp of 20 W×2 is placed as a projector 400 mm under an XY table, and a mask having a slit width of 10 mm was provided. When light is directed at an angle of 12 formed between a line connecting the projector and a light receiver and a line vertical to the surface of a film to be measured, if an optical defect is present there, the part glares, and light quantity thereof was converted into an electric signal by a CCD image sensor camera place 500 mm over the XY table, and the electric signal was amplified, and differentiated and compared with threshold level by a converter, and a detection signal of the optical defect is output. On the other hand, a video signal input from the CCD image sensor camera is treated according to an image procedure to measure an optical defect, and the position of the optical defect having a set size is displayed.

By using the above-mentioned optical defect detection apparatus, optical defects due to foreign materials and optical defects due to coarse coagulated materials in a coating solution are selected from the detected defect parts, further, the sample was cut into suitable size, and observed along the vertical direction to the film surface by a microscope equipped with scale, and the size was measured.

In the case of an optical defect due to foreign materials, the maximum diameter of the foreign materials was measured and the number of foreign materials having a size of 20 $\mu$m or more was calculated per unit area of the film (1 m²). Namely, foreign materials having a size of 20 μm or more in a film mean the number (number/m²) of foreign materials having a maximum diameter of 20 μm or more present in the film when they are observed along the vertical direction to the film surface.

In the case of a coarse coagulated material in a coating solution, the maximum diameter of the coarse coagulated materials was measured, foreign materials having a size of 100 μm or more were measured as the number per unit area (1 m²) of an easy adhesion layer. Namely, coagulated materials having a size of 100 μm or more in an easy adhesion layer mean the number (number/m²) of foreign materials having a maximum diameter of 100 μm or more present on the surface of and in the easy adhesion layer.

(4) Haze Value

It was measured by using a haze meter (model: TC-H3DP; manufactured by Tokyo Denshoku Kogyo K.K.) according to JIS-K7105.

(5) Spectral Property

It was measured at a wavelength of 200 to 1500 nm, using an auto-recording spectrophotometer (type U-3500, manufactured by Hitachi Ltd.)

(6) Environmental Stability

A sample was left for 500 hours under an atmosphere of a temperature of 60° C. and a humidity of 95%, then, the above-described spectral property was measured.

Example 1

(1) Preparation of Polymer Easy Adhesion Layer Coating Solution

A coating solution used in a polymer easy adhesion layer laminated on a transparent polymer film in the present invention was prepared according to the following method.

95 parts by weight of dimethylterephthalate, 95 parts by weight of dimethylisophthalate, 35 parts by weight of ethylene glycol, 145 parts by weight of neopentyl glycol, 0.1 part by weight of zinc acetate and 0.1 part by weight of antimony trioxide were charged into a reaction vessel, and a transesterification was conducted at 180° C. over 3 hours. Then, 6.0 parts by weight of 5-sodium isophthalic acid was added, and a transesterification was conducted at 240° C. over 1 hours, then, a polycondensation reaction was conducted at 250° C. under reduced pressure (0.267 to 13.3 hPa) over 2 hours, to obtain a polyester resin having a molecular weight of 19,500 and a softening point of 60° C.

6.7 parts by weight of a 30 wt % water dispersion of the resulted polyester resin (A), 40 parts by weight of a 20 wt % aqueous solution of a self crosslinking type polyurethane resin (B) having an isocyanate group blocked with sodium bisulfite (Elastron H-3: trade name, manufactured by Daiichi Kogyo Seiyaku Co., Ltd.), 0.5 parts by weight of a catalyst (Cat 64) for Elastron, 44.3 parts by weight of water and 5 parts by weight of isopropyl alcohol were mixed, and further, to this was added 0.6 parts by weight of a 10 wt % aqueous solution of an anionic surfactant, 1.8 parts by weight of a 20 wt % water dispersion of a spherical silica particle A (Snow Tex OL, manufactured by Nissan Chemical Industries, Ltd., average particle size: 40 nm) and 1.1 parts by weight a 4 wt % water dispersion of a dry method silica particle B (Aerosil OX 50, manufactured by Nippon Aerosil K.K., average particle size: 500 nm, average primary particle size: 40 nm), to give a coating solution (hereinafter, abbreviated as coating solution AB).

(2) Production of PET Resin for Substrate Film

An esterification reaction vessel was heated, and when reached to 200° C., slurry comprising 86.4 parts by weight of terephthalic acid and 64.4 parts by weight of ethylene glycol was charged, and 0.017 parts by weight of antimony trioxide and 0.16 parts by weight of triethylamine were added as a catalyst while stirring. Then, the mixture was heated under pressure, and a pressure esterification reaction was conducted under conditions of a gage pressure of 3.5 kg/cm² and a temperature of 240° C. Then, the pressure in the esterification reaction vessel was returned to normal pressure, and to this was added 0.071 parts by weight of magnesium acetate tetrahydrate, then, 0.014 parts by weight of trimethyl phosphate. Further, the mixture was heated to 260° C. over 15 minutes, and to this was added 0.012 parts by weight of trimethyl phosphate, then, 0.0036 parts by weight of sodium acetate. 15 minutes later, the resulted esterified reaction product was transported to a polycondensation reaction vessel, the temperature was raised from 260° C. to 280° C. gradually under reduced pressure, and a polycondensation reaction was conducted at 285° C. After completion of the polycondensation reaction, filtration treatment was conducted by a NASLON filter having a 95% cut diameter of 5 μm. In a sealed room in which the amount of foreign materials having a size of 1 μm or more in air had been reduced by a HEPA filter, a molten resin was extruded through a nozzle using cooling water previously filtrated (pore size 1 μm or less), and this PET resin in the form of a strand was cut to obtain a PET chip. The resulted PET chip (A) had an intrinsic viscosity of 0.616dl/g, an Sb content of 144 ppm, a Mg content of 58 ppm, a P content of 40 ppm, a color L value of 56.2, and a color b value of 1.6, and contained substantially no inert particle and internal deposition particle.

(3) Production of Easy Adhesion Film

The above-mentioned PET chip (A) was used as a raw material of a film, and dried at 135° C. for 6 hours under reduced pressure (1.33 hPa), then, fed to an extruder. In this operation, the molten resin was filtrated using a stainless sintered filtration material having a filtration particle size (initial filtration efficiency: 95%) of 15 μm. Then, the molten resin having a temperature of about 280° C. was melt-extruded through a die into a sheet form, and quenched and solidified on a metal cooling roll (chill roll) kept at a surface temperature of 20° C. while applying static electricity, to obtain an undrawn film having thickness of 1400 μm.

Then, this undrawn film was heated to 100° C. using heated rolls and an infrared heater, then, stretched 3.5-fold along the longitudinal direction by rolls having different peripheral speeds to obtain a monoaxially oriented PET film.

Then, the above-mentioned coating solution was precisely filtrated through a felt type polypropylene filtration material having a filtration particle size (initial filtration efficiency: 95%) of 25 μm, and coated and dried on one surface of the above-mentioned monoaxially oriented PET film by a reverse roll method. The degree of cleanness (number of particles of 0.5 μm or more/ft³) in air from production of the undrawn cast film to the coating process was controlled by a HEPA filter so that it reached class 100,000. Subsequently, the end of the film was grasped and the coated layer was dried at 80° C. for 20 seconds in a pre-heat zone in a tenter, then, stretched 4.0-fold at 130° C. along cross direction in a cross stretching zone. Then, heat fixing treatment was conducted at 240° C., further, cross relaxation treatment of 3% was conducted at 200° C., to obtain a biaxially oriented PET film having an easy adhesion layer having a thickness of 100 μm. The coated amount was 0.10 g/m² in terms of solid content. The resulted biaxially oriented PET film having an easy adhesion layer contained substantially no particle in the film, and the amount of foreign materials having a maximum diameter of 20 μm or more present in the film was 6/m², and the amount of foreign materials having a maximum diameter of 100 μm or more present on the surface of and in the easy adhesion layer was 3/m².

(4) Production of Infrared Absorption Layer Polymer Resin

A base polyester used as a dispersing medium was produced by the following method.

Into an autoclave equipped with a thermometer and a stirrer was charged

| | |
|---|---|
| Dimethyl terephthalate | 136 parts by weight |
| Dimethyl isophthalate | 58 parts by weight |
| Ethylene glycol | 96 parts by weight |
| Tricyclodecanedimethanol | 137 parts by weight |
| Antimony trioxide | 0.09 parts by weight | and the mixture was heated at 170 to 220° C. for 180 minutes and a transesterification reaction was conducted. Then, the temperature of the system was raised to 245° C., and the reaction was continues for 180 minutes at a pressure of the system of 1.33 to 13.3 hPa, resulting in formation of a copolymerized polyester resin (A1). The copolymerized polyester resin (A1) had an intrinsic viscosity of 0.4 dl/g, and a glass transition temperature of 90° C., and a specific gravity of 1.245.

The composition ratio of constituent components of the copolymerized polyester resin (A1) according to NMR analysis is as follows.

| | |
|---|---|
| Acid component | |
| Tereplithalic acid | 71 mol% |
| Isophthalic acid | 29 mol% |
| Alcohol component | |
| Ethylene glycol | 28 mol% |
| Tricyclodecanedimethanol | 72 mol% |

(5) Production of Infrared Absorption Filter

Into a flask was added a solvent, the above-mentioned copolymerized polyester resin (A1) and an infrared absorption coloring matter at a composition as shown in Table 1, the mixture was dissolved by heating under stir to prepare an infrared absorption layer coating solution. The infrared absorption layer coating solution was coated on the easy adhesion layer surface of the above-mentioned easy adhesion PET film substrate by using an applicator having a gap of 50 μm, and dried for 1 hour at a drying temperature of 90° C., to obtain an infrared absorption filter. The thickness of the coated layer after drying was 12 μm and the remaining solvent amount was 1 wt %.

Table 1

| | Material | Compounding amount (parts by weight) |
|---|---|---|
| Infrared absorption coloring matter | Diimmonium salt-based compound Kayasorb IRG-022, manufactured by Nippon Kayaku Co., Ltd. | 6.6 |
| | Fluorine-containing phthalocyanine compound Excolor IR-1, manufactured by Nippon Shokubai Co., Ltd. | 1.1 |
| | Nickel complex-based compound SIR-159, manufactured by Mitsui Chemical K. K. | 3.3 |

-continued

| | Material | Compounding amount (parts by weight) |
|---|---|---|
| Polymer resin | Copolymerized polyester resin (A1) | 440 |
| Solvent | Methyl ethyl ketone | 490 |
| | Tetrahydrofuran | 490 |
| | Toluene | 490 |

The resulted infrared absorption filter looked dark gray with eyes. The optical properties thereof are shown in FIG. 1. As shown in FIG. 1, the infrared absorption filter has flat absorption in the visible region in the wavelength range of 400 nm to 650 nm, and has a difference in transmittance between 450 nm and 650 nm of 10% or less. At wavelengths of 700 nm or more, steep absorption is found, the maximum transmittance from 800 nm to 110.0 nm is 30% or less. Further, the transmittance at a wavelength of 550 nm is 50% or more. The above-mentioned easy adhesion PET film substrate had a haze value of as extremely low as 0.5% and was highly transparent.

Figure 2:
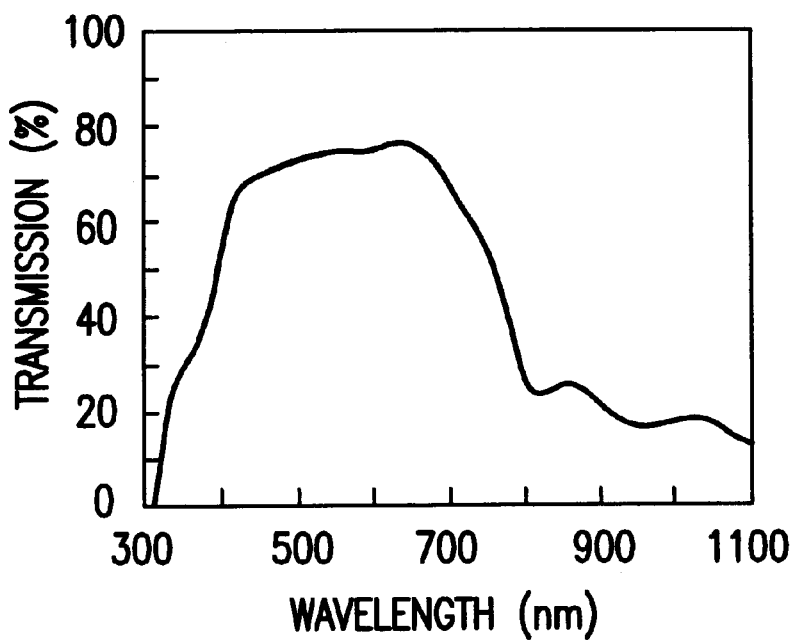
FIG. 2 is an explanation view showing spectral properties of an infrared absorption filter in Example 1 after being left for 500 hours under an atmosphere of a temperature of 60° C. and a humidity of 95%.

The resulted infrared absorption filter was left for 500 hours under an atmosphere of a temperature of 60° C. and a humidity of 95%, and the spectral properties were measured again to give results as shown in FIG. 2, wherein, infrared absorption property is maintained though slight color change is observed. Further, when the resulted filter was placed in front of a plasma display, no change of color was found, contrast was improved, and radiation of infrared ray decreased.

Example 2

The infrared absorption filter produced in Example 1 was used, and hard coat treatment layer (HC) was provided on the surface of a transparent polyester film on the opposite side to the infrared absorption layer of the infrared absorption filter. As the hard coat layer, an ultraviolet ray curing type resin composition prepared by adding 4 parts of benzophenone to 100 parts of an epoxyacrylic resin was used, it was formed into a film by a bar coating method, dried previously for 5 minutes at 80° C., and cured by irradiation of ultraviolet ray of 500 mJ/cm². The thickness of the hard coat treatment layer (HC) after curing was 5 μm.

Then, a copper foil having a thickness of 9 μm was pasted on the infrared absorption layer via a UV curing type adhesive, the pasted copper foil was patterned using a photoresist, and an electromagnetic wave shield layer was formed by performing etching treatment. The line width of the copper foil was 15 μm, the pitch was 115 μm, and the aperture ratio was 75%.

Figure 3:
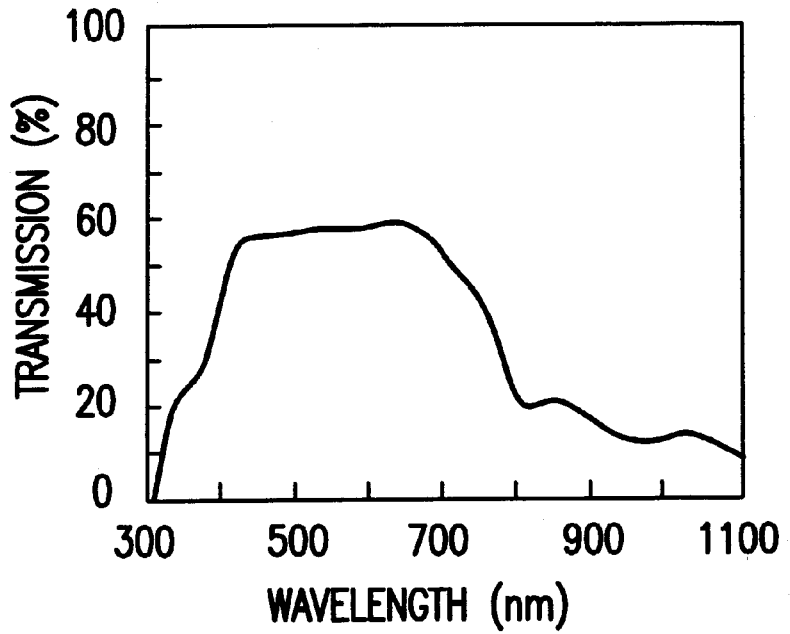
FIG. 3 is an explanation view showing spectral properties of an infrared absorption filter in Example 2.

The spectral properties of the infrared absorption filter obtained by laminating the hard coat layer and electromagnetic wave shield layer together with the infrared absorption layer as described above are shown in FIG. 3. As shown in FIG. 3, the above-mentioned infrared absorption filter had a difference in transmittance between 450 nm and 650 nm of 10% or less, a maximum transmittance from 800 nm to 1100 nm of 30% or less, and a transmittance at a wavelength of 550 nm of 50% or more, absorbs infrared ray, manifests gray tone, and absorbs electromagnetic waves, while maintaining high visual light transmittance.

Further, when the resulted infrared absorption filter was left for 500 hours under an atmosphere of a temperature of 60° C. and a relative humidity of 95%, and the spectral properties were measured again, to find maintenance of the infrared absorption property in spite of slight color change observed.

Comparative Example 1

(3) Production of Easy Adhesion Film

A PET resin was obtained in the same manner as in Example 1, as the PET resin (B) for a film, except that ethylene glycol slurry (11 wt %) of silica particles having an average particle size (centrifugal precipitation mode light transmission type particle size distribution measuring method; SA-CP3, manufacture by Shimadzu Corp.) of 10 μm was added to the PET resin produced after the second addition of the trimethyl phosphate, as an amount of 2000 ppm in terms of the silica particle, and filtration treatment was conducted by a NASLON filter having a 95% cut diameter of 28 μm after completion of the polycondensation reaction. The resulted PET chip (B) had an intrinsic viscosity of 0.616 dl/g, an Sb content of 144 ppm, a Mg content of 58 ppm, a P content of 40 ppm, a color L value of 57.6, and a color b value of 1.2, and contained 2000 ppm of the silica particle based on the PET.

A biaxially oriented PET film having an easy adhesion layer on one surface was obtained in the same manner as in Example 1 except that the above-mentioned PET resin (A) containing no particle and the above-mentioned silica particle-containing PET resin (B) were mixed as a ratio by weight of 90:10, and a stainless sintered filtration material having a filtration particle size (initial filtration efficiency: 95%) of 20 μm was used in filtrating the molten resin in the melt extrusion process of the PET resin. The number of foreign materials in the resulted biaxially oriented PET film having the easy adhesion layer and foreign materials having a maximum diameter of 100 μm or more present on the surface and in the easy adhesion layer are shown in Table 3.

(5) Production of Infrared Absorption Filter

An infrared absorption layer coating solution was prepared in the same manner as in Example 1 except that the polymer resin which is the constituent component of the infrared absorption layer was changed to a copolymerized polyester resin (Vyron RV 200, manufactured by Toyobo Co., Ltd.) having a specific gravity of 1.26 and a glass transition temperature of 67° C. as shown in Table 2, and a diimmonium salt-based compound was singly used as the infrared absorption coloring matter, in Example 1. The above-mentioned infrared absorption layer coating solution was coated on the surface of the easy adhesion layer of the above-mentioned biaxially oriented PET film by using an applicator having a gap of 100 μm, dried at a drying temperature of 90° C. for 1 hour, to obtain an infrared absorption filter. The thickness of the infrared absorption layer after drying was 25 μm and the remaining solvent amount was 1% by weight.

TABLE 2

| | Material | Compounding amount (parts by weight) |
|---|---|---|
| Infrared absorption coloring matter | Diimmonium salt-based compound Kayasorb IRG-022, manufactured by Nippon Kayaku Co., Ltd. | 3.2 |
| Polymer resin | Copolymerized polyester resin Vyron RV200, manufactured by Toyobo Co., Ltd. | 440 |

TABLE 2-continued

| | Material | Compounding amount (parts by weight) |
|---|---|---|
| Solvent | Methyl ethyl ketone | 490 |
| | Tetrahydrofuran | 490 |
| | Toluene | 490 |

Figure 4:
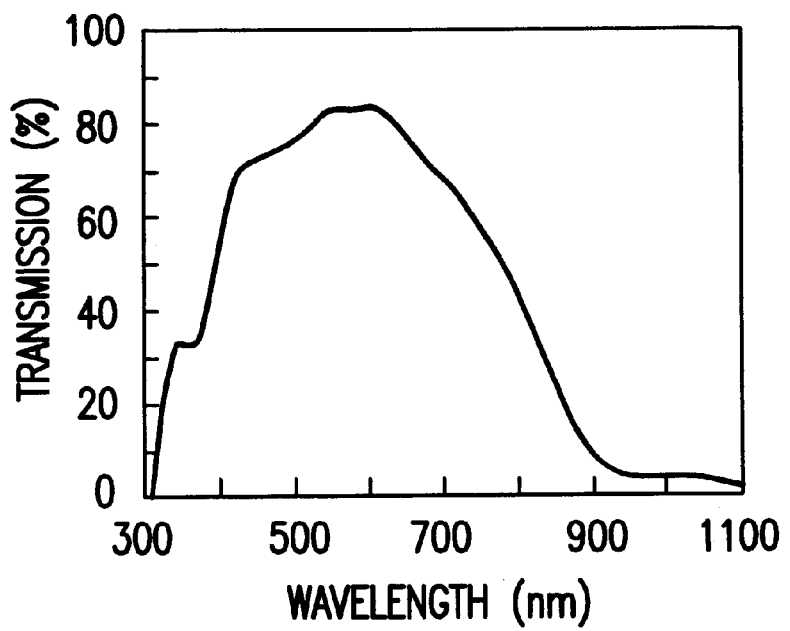
FIG. 4 is an explanation view showing spectral properties of an infrared absorption filter in Comparative Example 1.

The color observed with eyes of the resulted infrared absorption filter was changed to brown completely. The optical properties thereof are shown in FIG. 4. As shown in FIG. 4, an infrared absorption filter was obtained revealing angle property having a peak at about 550 nm in the visible region in the wavelength of 400 nm to 650 nm. The maximum transmittance from 800 nm to 1100 nm was 30% or less and the transmittance at a wavelength of 550 nm was 50% or more, however, the difference in transmittance between 450 nm and 650 nm was over 10%. Further, the haze value of the above-mentioned easy adhesion PET film substrate was as high as 2.6%.

Further, when the resulted infrared absorption filter was left for 500 hours under an atmosphere of a temperature of 60° C. and a relative humidity of 95%, and the spectral properties were measured again, to find that absorption in the near-infrared region disappeared. Further, the color was changed to green.

Then, when the resulted infrared filter was placed in front of a plasma display, color balance was broken and the color changed to greenish color.

TABLE 3

| | | Example 1 | Comparative Example 1 |
|---|---|---|---|
| Particle in polyester film | Kind | Substantially none | Silica (1.0 μm) |
| | Content (ppm) | | 200 |
| Foreign material having a size of 20 μm or more in film | (number/m²) | 6 | 95 |
| Coagulated material having a size of 100 μm or more in easy adhesion layer | (number/m²) | 3 | 3 |
| Adhesion with photocuring type acrylic coat layer | (%) | 100 | 100 |
| Film haze | (%) | 0.5 | 2.6 |

Comparative Example 2

The infrared absorption filter produced in Comparative Example 1 was used, and a hard coat treatment layer (HC) was provided on the surface of a transparent polyester film on the opposite side to the infrared absorption layer of the infrared absorption filter. As the hard coat agent, an ultraviolet ray curing type resin composition prepared by adding 4 parts of benzophenone to 100 parts of an epoxyacrylic resin was used, it was formed into a film by a bar coating method, dried previously for 5 minutes at 80° C., and cured by irradiation of ultraviolet ray of 500 mJ/cm². The thickness of the hard coat treatment layer (HC) after curing was 5 μm.

Then, a copper foil having a thickness of 9 μm was pasted on the infrared absorption layer via a UV curing type adhesive, the pasted copper foil was patterned using a photoresist, and an electromagnetic wave shield layer was formed by performing etching treatment. The line width of the copper foil was 15 μm, the pitch was 115 μm, and the aperture ratio was 75%.

Figure 5:
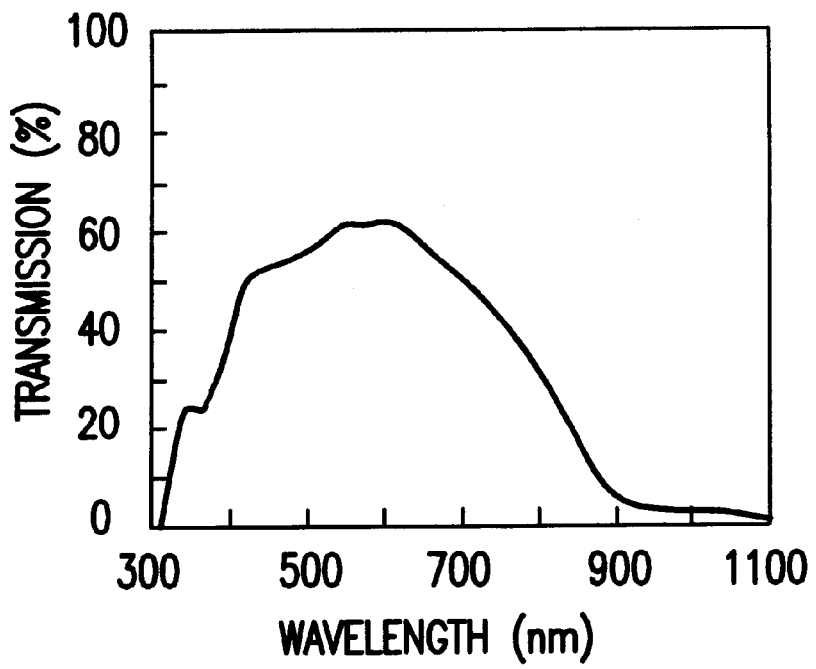
FIG. 5 is an explanation view showing spectral properties of an infrared absorption filter in Comparative Example 2.

The spectral properties of the infrared absorption filter obtained by laminating the hard coat layer and electromagnetic wave shield layer together with the infrared absorption layer as described above are shown in FIG. 5. As shown in FIG. 5, the above-mentioned infrared absorption filter absorbs infrared ray and electromagnetic wave, however, the tone was greening color.

Further, when the resulted infrared absorption filter was left for 500 hours under an atmosphere of a temperature of 60° C. and a relative humidity of 95%, and the spectral properties were measured again, to find no infrared absorption property.

Comparative Example 3
(5) Production of Infrared Absorption Filter

An infrared absorption layer coating solution was prepared in the same manner as in example 1 except that a coating solution having a composition as shown in Table 4 was used as the infrared absorption layer coating solution, in Example 1. The above-mentioned infrared absorption layer coating solution was coated and dried on the surface of the easy adhesion layer of the above-mentioned biaxially oriented PET film, to obtain an infrared absorption filter. The thickness of the infrared absorption layer after drying was 25 μm and the remaining solvent amount was 1 wt %.

TABLE 4

| | Material | Compounding amount (parts by weight) |
|---|---|---|
| Infrared absorption coloring matter and visible ray coloring matter | Diimmonium salt-based compound Kayasorb IRG-022, manufactured by Nippon Kayaku Co., Ltd. | 4.8 |
| | Fluorine-containing phthalocyanine compound Kayaset Blue A-2R, manufactured by Nippon Kayaku Co., Ltd. | 2.2 |
| | Nickel complex-based compound SIR-128, manufactured by Mitsui Chemical K. K. | 1.3 |
| Polymer resin | Copolymerized polyester resin (A1) | 440 |
| Solvent | Methyl ethyl ketone | 490 |
| | Tetrahydrofuran | 490 |
| | Toluene | 490 |

Figure 6:
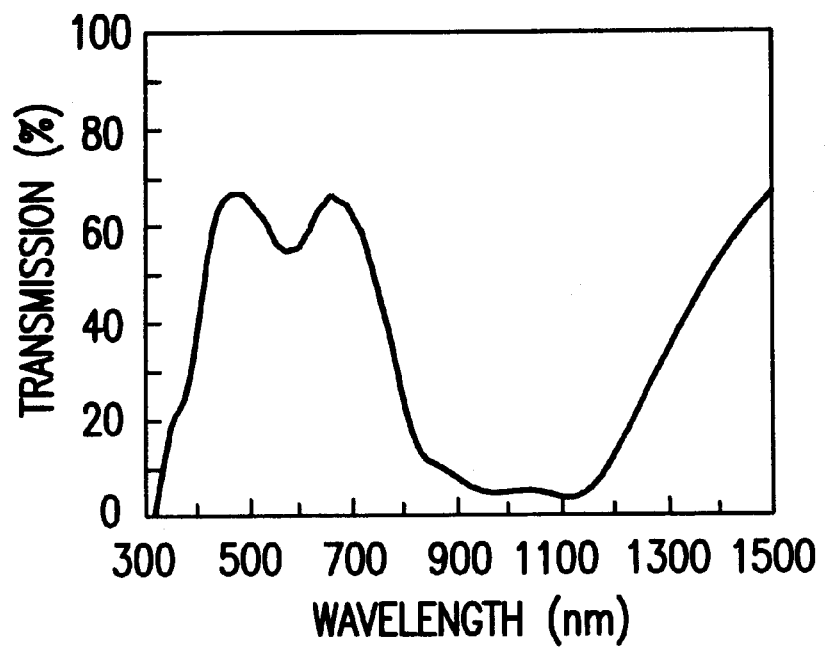
FIG. 6 is an explanation view showing spectral properties of an infrared absorption filter in Example 3.

The color of the infrared absorption filter observed with eyes was blue-gray. The optical properties thereof are shown in FIG. 6.

The resulted filter has a minimum transmittance from 440 nm to 500 nm of 65.0%, a minimum transmittance from 640 nm to 700 nm of 61.5%, a maximum transmittance from 550 nm to 600 nm of 56.9%, and a maximum transmittance in the near-infrared region from 900 nm to 1100 nm of 7.9%.

Further, when the resulted infrared absorption filter was placed in front of a plasma display and the like, the color did not change, contrast increased, and radiation of infrared ray decreased.

Comparative Example 4
(5) Production of Infrared Absorption Filter

An infrared absorption layer coating solution was prepared in the same manner as in example 1 except that a coating solution having a composition as shown in Table 5 was used as the infrared absorption layer coating solution, in Example 1. The above-mentioned infrared absorption layer coating solution was coated and dried on the surface of the easy adhesion layer of the above-mentioned biaxially oriented PET film, to obtain an infrared absorption filter. The thickness of the infrared absorption layer after drying was 25 μm and the remaining solvent amount was 1 wt %.

TABLE 5

| | Material | Compounding amount (parts by weight) |
|---|---|---|
| Infrared absorption coloring matter | Diimmonium salt-based compound Kayasorb IRG-022, manufactured by Nippon Kayaku Co., Ltd. | 4.8 |
| | Phthalocyanine compound Kayaset Blue-A-2R, manufactured by Nippon Kayaku Co., Ltd. | 1.5 |
| | Nickel complex-based compound SIR-159, manufactured by Mitsui Chemical K. K. | 2.1 |
| | SIR-128, manufactured by Mitsui Chemical K. K. | 0.6 |
| Polymer resin | Copolymerized polyester resin (A1) | 440 |
| Solvent | Methyl ethyl ketone | 490 |
| | Tetrahydrofuran | 490 |
| | Toluene | 490 |

Figure 7:
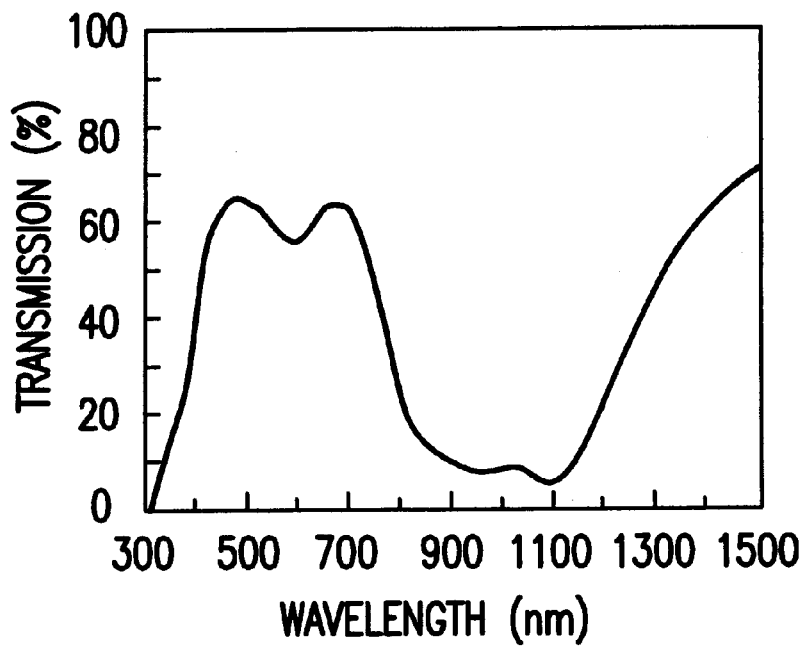
FIG. 7 is an explanation view showing spectral properties of an infrared absorption filter in Example 4.

The color of the infrared absorption filter observed with eyes was blue-gray. The optical properties thereof are shown in FIG. 7.

The resulted filter has a minimum transmittance from 440 nm to 500 nm of 62.0%, a minimum transmittance from 640 nm to 700 nm of 62.8%, a maximum transmittance from 550 nm to 600 nm of 59.2%, and a maximum transmittance in the near-infrared region from 900 nm to 1100 nm of 9.9%.

Further, when the resulted infrared absorption filter was placed in front of a plasma display and the like, the color did not change, contrast increased, and radiation of infrared ray decreased.

Reference Example 1 (Reference Example of Examples 3, 4)
(5) Production of Infrared Absorption Filter An infrared absorption layer coating solution was prepared in the same manner as in example 1 except that a coating solution having a composition as shown in Table 2 (used in Comparative Example 1) was used as the infrared absorption layer coating solution, in Example 1. The above-mentioned infrared absorption layer coating solution was coated and dried on the surface of the easy adhesion layer of the above-mentioned biaxially oriented PET film, likewise. The thickness of the infrared absorption layer after drying was 25 μm and the remaining solvent amount was 1 wt %.

The color of the resulted infrared absorption filter observed with eyes changed to brown. The optical properties thereof are shown in FIG. 8.

Figure 8:
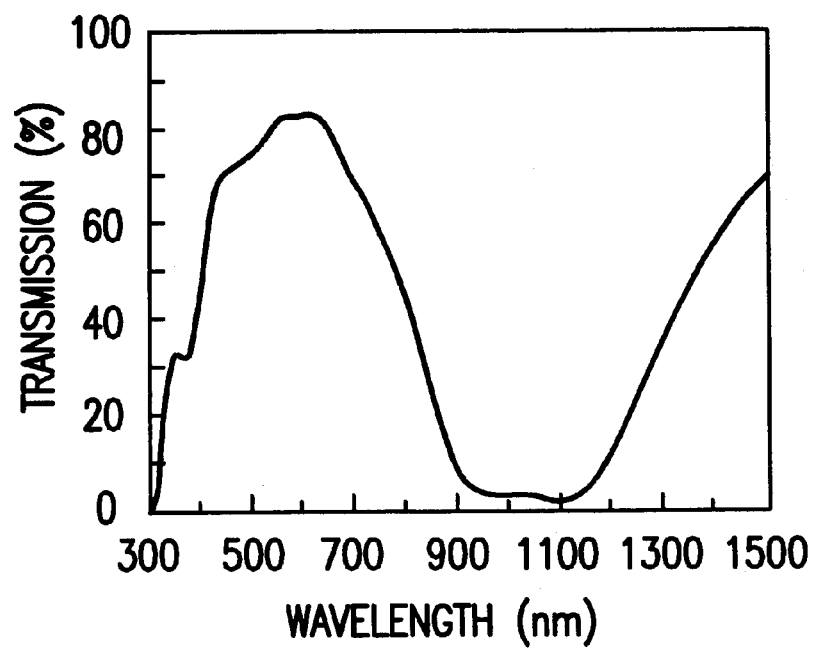
FIG. 8 is an explanation view showing spectral properties of an infrared absorption filter in Reference Example 1.

As shown in FIG. 8, an infrared absorption filter was obtained revealing angle property having a peak at about 5.50 nm in the visible region in the wavelength of 400 nm to 650 nm. The resulted filter has a minimum transmittance from 440 nm to 500 nm of 70.6%, a minimum transmittance from 640 nm to 700 nm of 68.3%, a maximum transmittance from 550 nm to 600 nm of 82.7%, and a maximum transmittance in the near-infrared region from 900 nm to 1100 nm of 8.1%.

Further, when the resulted infrared absorption filter was placed in front of a plasma display and the like, color balance was broken, and greenish tone was obtained.

Example 5

(5) Production of Infrared Absorption Filter

An infrared absorption layer coating solution was prepared in the same manner as in example 1 except that a coating solution having a composition as shown in Table 6 was used as the infrared absorption layer coating solution, in Example 1. The above-mentioned infrared absorption layer coating solution was coated and dried on the surface of the easy adhesion layer of the above-mentioned biaxially oriented PET film, likewise. The thickness of the infrared absorption layer after drying was 25 μm and the remaining solvent amount was 1 wt %.

TABLE 6

| | Material | Compounding amount (parts by weight) |
| --- | --- | --- |
| Infrared absorption coloring matter | Diimmonium salt-based compound Kayasorb IRG-022, manufactured by Nippon Kayaku Co., Ltd. | 3.2 |
| | Fluorine-containing phthalocyanine compound Excolor IR-1, manufactured by Nippon Shokubai Co., Ltd. | 0.5 |
| | Nickel complex-based compound SIR-159, manufactured by Mitsui Chemical K. K. | 1.6 |
| Polymer resin | Copolymerized polyester resin (A1) | 440 |
| Solvent | Methyl ethyl ketone | 490 |
| | Tetrahydrofuran | 490 |
| | Toluene | 490 |

The color of the resulted infrared absorption filter observed with eyes was dark-gray. The optical properties thereof are shown in FIG. 9.

Figure 9:
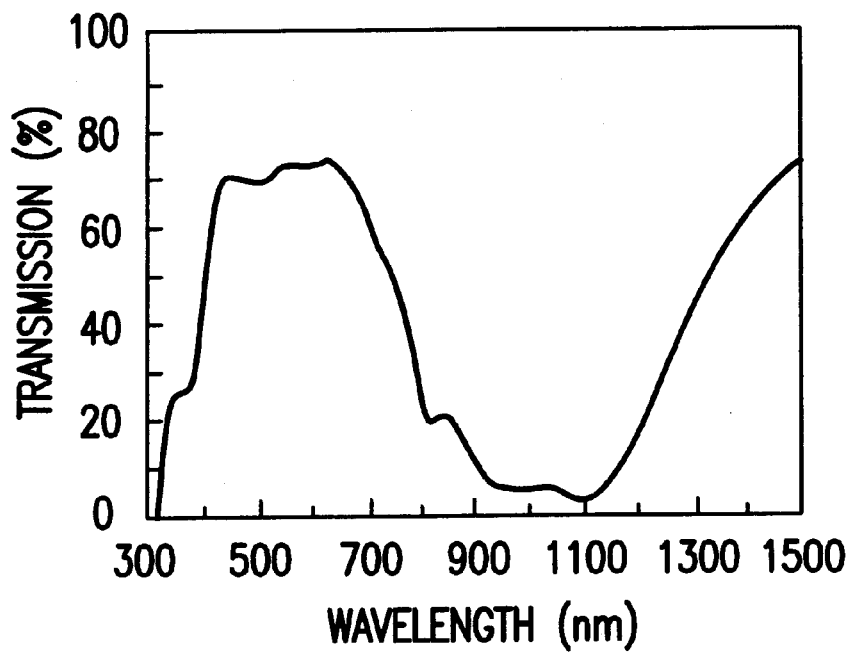
FIG. 9 is a view showing spectral properties of an infrared absorption filter obtained in Example 5.

As shown in FIG. 9, the infrared absorption filter was obtained which manifested flat absorption in the visible region in the wavelength range of 400 nm to 650 nm, and had steep absorption at wavelengths of 700 nm or more, and the difference in transmittance between 450 nm and 650 nm was 10% or less, the maximum transmittance from 800 nm to 1100 nm was 30% or less, and the transmittance at a wavelength of 550 nm was 50% or more.

Figure 10:
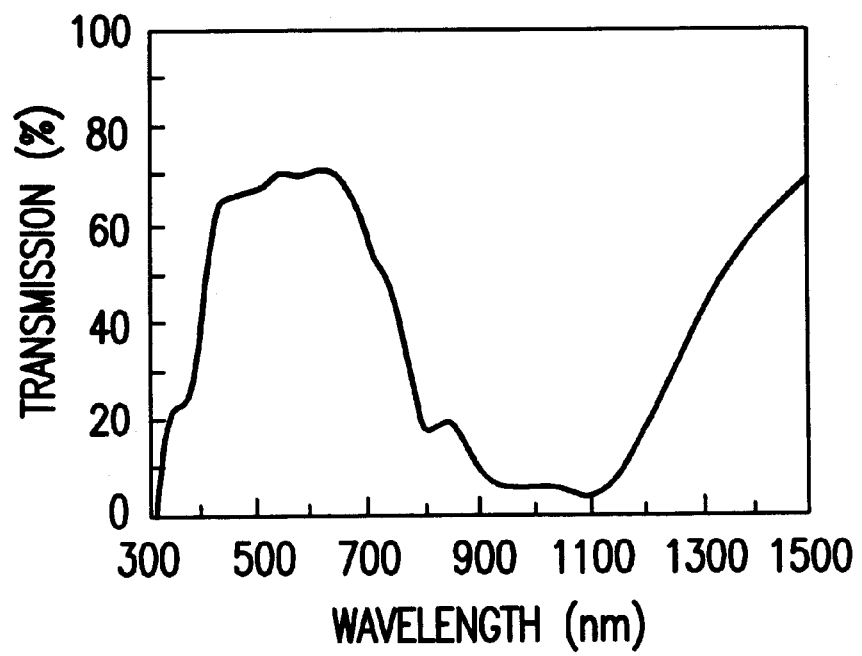
FIG. 10 is a view showing spectral properties of an infrared absorption filter obtained in Example 5 after being left for 500 hours under an atmosphere of a temperature of 60° C. and a humidity of 95%.

The resulted infrared absorption filter was left for 500 hours under an atmosphere of a temperature of 60° C. and a relative humidity of 95%, and the spectral properties were measured again to give results as shown in FIG. 10, wherein, the difference in transmittance between 450 nm and 650 nm was 10% or less, the maximum transmittance from 800 nm to 1100 nm was 30% or less, and the transmittance at a wavelength of 550 nm was 50% or more, though slight color change was observed. Further, when the resulted filter was placed in front of a plasma display, no change of color was found, contrast was improved, and radiation of infrared ray decreased.

Reference Example 2 (Reference Example of Examples 5)

(5) Production of Infrared Absorption Filter

An infrared absorption filter was prepared in the same manner as in example 5 except that a copolymerized polyester resin (Vyron RV 200, manufactured by Toyobo Co., Ltd, specific gravity: 1.255, glass transition temperature: 67° C.) was used as the infrared absorption layer polymer resin in the composition of the infrared absorption layer coating solution shown in Table 6, in Example 5. The thickness of the infrared absorption layer after drying was 25 μm and the remaining solvent amount was 1 wt %.

Figure 11:
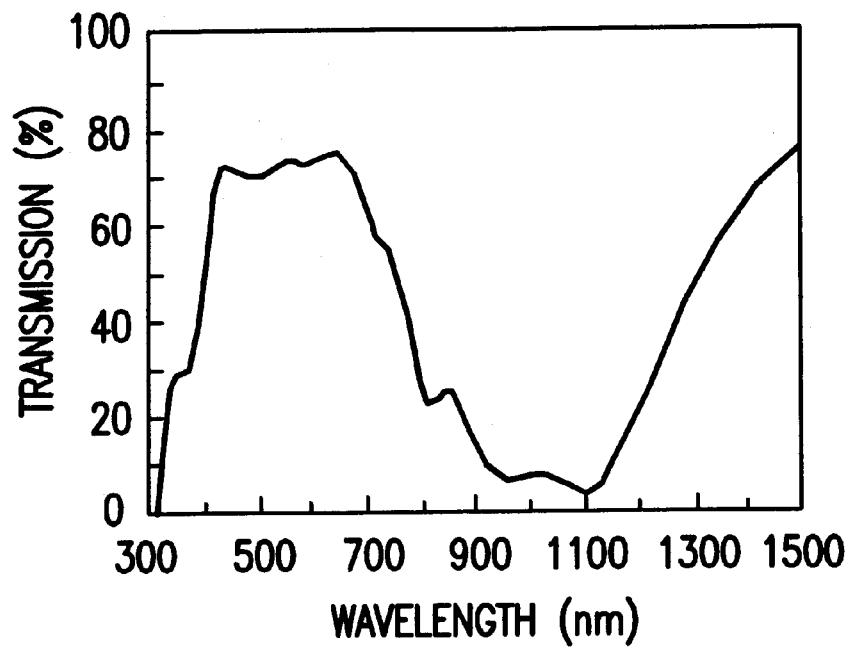
FIG. 11 is a view showing spectral properties of an infrared absorption filter obtained in Reference Example 2.

The color of the resulted infrared absorption filter observed with eyes was dark-gray. The optical properties thereof are shown in FIG. 11. As shown in FIG. 11, the infrared absorption filter was obtained which manifested flat. absorption in the visible region in the wavelength range of 400 nm to 650 nm, and had steep absorption at wavelengths of 700 nm or more, as shown in FIG. 11. The difference in transmittance between 450 nm and 650 nm was 10% or less, the maximum transmittance from 800 nm to 1100 nm was 30% or less, and the transmittance at a wavelength of 550 nm was 50% or more.

Figure 12:
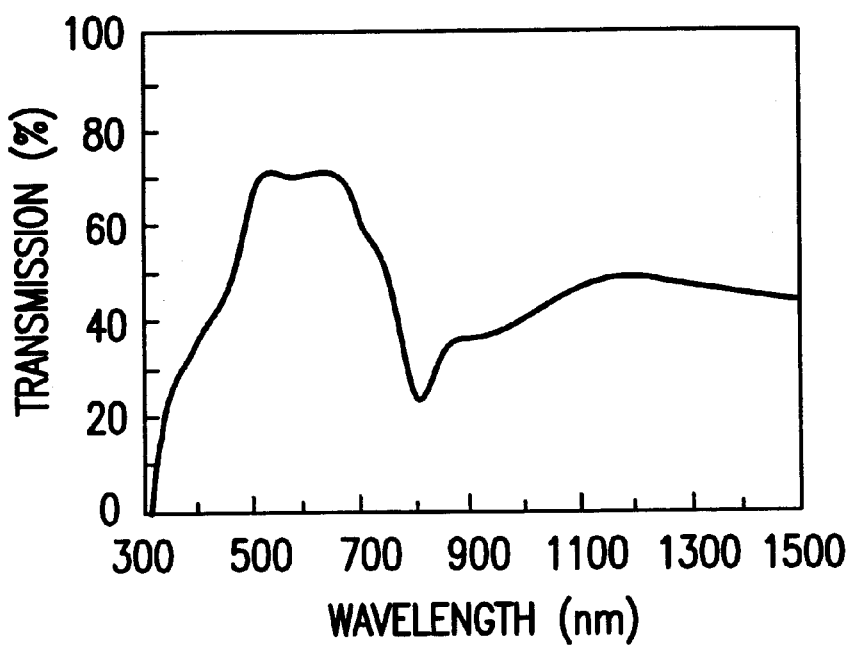
FIG. 12 is a view showing spectral properties of an infrared absorption filter obtained in Reference Example 2 after being left for 500 hours under an atmosphere of a temperature of 60° C. and a humidity of 95%.

However, when the resulted infrared absorption filter was left for 500 hours under an atmosphere of a temperature of 60° C. and a relative humidity of 95%, and the spectral properties were measured again to give results as shown in FIG. 12, wherein, the tone changed to green color, and the infrared absorption property became extremely worse.

Reference Example 3 (Reference Example of Examples 5)

(4) Production of Infrared Absorption Layer Polymer Resin

A copolymerized polyester used as a dispersing medium of an infrared absorption coloring matter was produced by the following method.

Into an autoclave equipped with a thermometer and a stirrer was charged

| | |
| --- | --- |
| Dimethyl terephthalate | 136 parts by weight |
| Dimethyl isophthalate | 58 parts by weight |
| Ethylene glycol | 105 parts by weight |
| Tricyclodecanedimethanol | 98 parts by weight |
| Antimony trioxide | 0.09 parts by weight | and the mixture was heated at 170 to 220° C. for 180 minutes and a transesterification reaction was conducted. Then, the temperature of the system was raised to 245° C., and the reaction was continues for 180 minutes at a pressure of the system of 1.33 to 13.3 hPa, resulting in formation of a copolymerized polyester resin (A2). This copolymerized polyester resin had an intrinsic viscosity of 0.4 dl/g, and a glass transition temperature of 80° C., and a specific gravity of 1.245.

The composition ratio of constituent components of the above-mentioned copolymerized polyester resin (A2) according to NMR analysis is as follows.

| | |
| --- | --- |
| Acid component | |
| Terephthalic acid | 71 mol % |
| Isophthalic acid | 29 mol % |
| Alcohol component | |
| Ethylene glycol | 49 mol % |
| Tricyclodecanedimethanol | 51 mol % |

(5) Production of Infrared Absorption Filter

An infrared absorption filter was prepared in the same manner as in example 5 except that the above-mentioned copolymerized polyester resin (A2) was used as the infrared absorption layer polymer resin in the composition of the infrared absorption layer coating solution shown in Table 6, in Example 5. The thickness of the infrared absorption layer after drying was 25 μm and the remaining solvent amount was 1 wt %. The difference in transmittance between 450 nm and 650 nm was 10% or less, the maximum transmittance from 800 nm to 1100 nm was 30% or less, and the transmittance at a wavelength of 550 nm was 50% or more. The color of the resulted infrared absorption filter observed with eyes was dark-gray. The optical properties thereof were approximately the same as those in Example 5 (FIG. 9).

Figure 13:
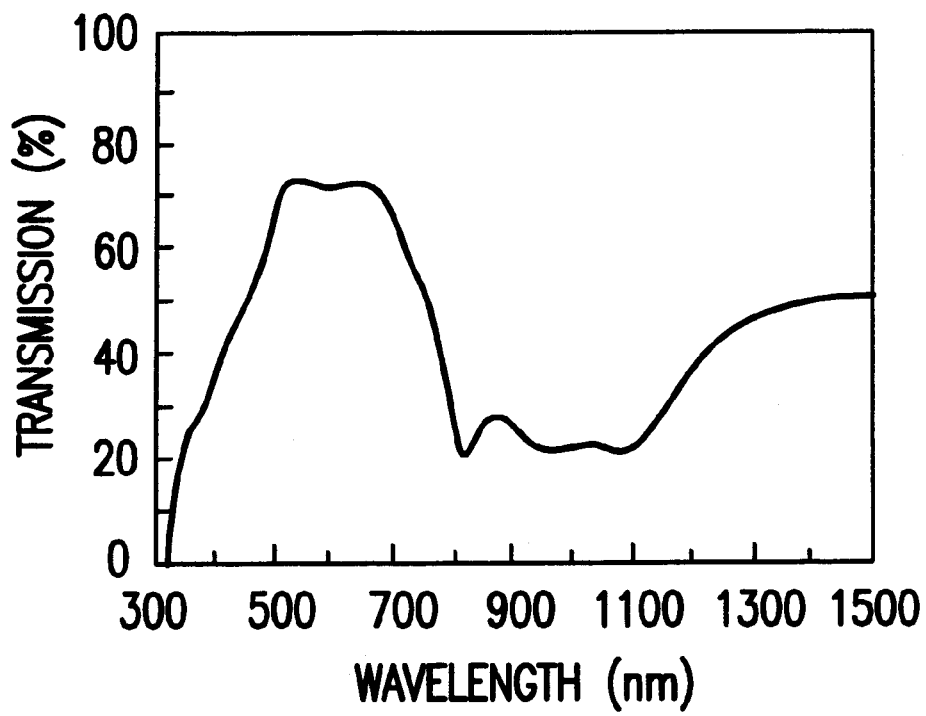
FIG. 13 is a view showing spectral properties of an infrared absorption filter obtained in Reference Example 3 after being left for 500 hours under an atmosphere of a temperature of 60° C. and a humidity of 95%.

However, when the resulted infrared absorption filter was left for 500 hours under an atmosphere of a temperature of 60° C. and a relative humidity of 95%, and the spectral properties were measured again to give results as shown in FIG. 13, wherein, the tone changed to green color, and the infrared absorption property became extremely worse.

Reference Example 4 (Reference Example of Examples 5)

(4) Production of Infrared Absorption Layer Polymer Resin

A copolymerized polyester (A3; glass transition temperature: 140° C., intrinsic viscosity: 0.42, molecular weight Mw: 45000) described in Example 1 of JP-A No. 9-838855 was used as the infrared absorption layer polymer resin.

(5) Production of Infrared Absorption Filter

An infrared absorption filter was prepared in the same manner as in example 5 except that the above-mentioned copolymerized polyester resin (A3) was used as the infrared absorption layer polymer resin in the composition of the infrared absorption layer coating solution shown in Table 6, in Example 5. The thickness of the infrared absorption layer after drying was 25 μm and the remaining solvent amount was 1 wt %. The difference in transmittance between 450 nm and 650 nm was 10% or less, the maximum transmittance from 800 nm to 1100 nm was 30% or less, and the transmittance at a wavelength of 550 nm was 50% or more. The color of the resulted infrared absorption filter observed with eyes was dark-gray. The optical properties thereof were approximately the same as those in Example 5 (FIG. 9).

However, when the resulted infrared absorption filter was allowed to stand still, it was bent. Further, when the resulted infrared absorption filter was left for 500 hours under an atmosphere of a temperature of 60° C. and a relative humidity of 95%, the infrared absorption layer was peeled completely from the PET film.

An infrared absorption filter of the present invention has large and wide absorption in the near-infrared region, and manifests high light transmission in the visible region, and has no optical defect. Also, this filter does not absorb significantly specific wavelength in the visible region. Further, the environmental stability is excellent (no change in spectral property and tone, even if use for a long period of time under high temperature and high humidity). This filter further has merits that processability and productivity are excellent, and it is not curled even after stand still. Therefore, it is particularly suitable as an infrared absorption filter for optical apparatuses such as a vide camera, display and the like, particularly for a plasma display.

Figure 14:
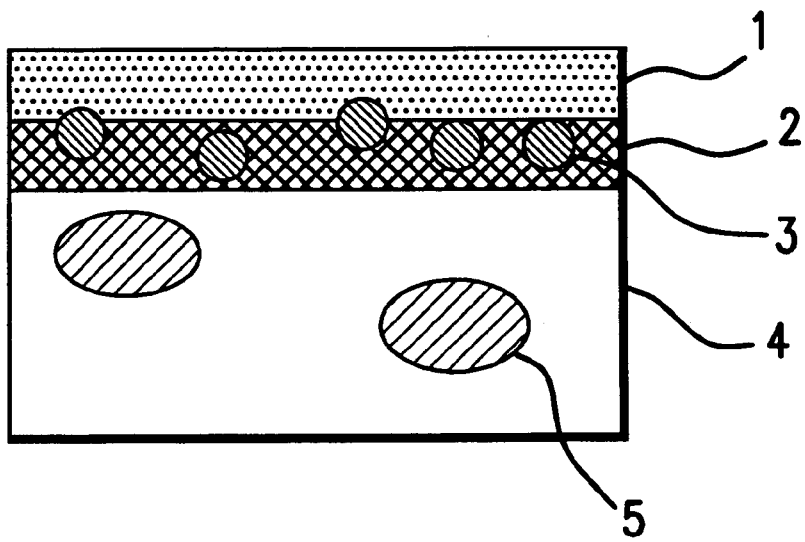
FIG. 14 is a sectional view schematically illustrating the layer constitution of an infrared absorption filter embodiment of the present invention.

FIG. 14 shows one embodiment of the present invention. In this particular embodiment, there are three layers: an infrared absorption layer 1, a polymer easy adhesion layer 2 containing inert particles 3, and a biaxially stretched polyester film 4 containing foreign material ($\geq 20$ μm) 5.

What is claimed is:

1. An infrared absorption filter comprising a transparent biaxially stretched polyester film;

a polymer easy adhesion layer laminated to at least one surface of the film; and an infrared absorption layer laminated to at least one polymer easy adhesion layer, wherein the film comprises substantially no inert or internal deposition particles, wherein the film comprises 0 to 10 particles, per square meter of film, of foreign material having a size of 20 μm or more, and wherein the adhesion layer comprises inert particles.

2. The infrared absorption filter according to claim 1, wherein the filter has the following properties:

a transmittance of at most 30% in the near-infrared region in the wavelength range of 800 to 1100 nm, a difference of 10% or less between a maximum value and a minimum value of transmittance in the visible light region in the wavelength range of 450 to 650 nm, and a transmittance of not lower than 50% at a wavelength of 550 nm.

3. The infrared absorption filter according to claim 2, wherein the filter has said properties after being left to stand in the atmosphere at a temperature of 60° C. and a humidity of 95% for 500 hours.

4. The infrared absorption filter according to claim 1, wherein the filter has the following properties:

a transmittance of not higher than 10% in the near-infrared region in the wavelength range of 900 to 1100 mn, a minimum transmittance of not lower than 60% in the visible light regions in the wavelength range of 440 to 500 nm and the wavelength range of 640 to 700 nm, a maximum transmittance of not higher than 60% in the visible light region in the wavelength range of 550 to 600 nm, and a transmittance of not lower than 50% at a wavelength of 550 nm.

5. The infrared absorption filter according to claim 1, wherein said infrared absorption layer comprises an infrared absorption coloring matter; and a polymer resin, wherein the coloring matter comprises two or more compounds selected from the group consisting of diiummonium salt-based compounds, phthalocyanine-based compounds and nickel complex-based compounds.

6. The infrared absorption filter according to claim 5, wherein the coloring matter comprises at least a diimmonium salt-based compound and at least one compound selected from the group consisting of fluorine-containing phthalocyanine-based compounds and nickel complex-based compounds.

7. The infrared absorption filter according to claim 5, wherein said diimmonium salt-based compound has a structure of the general formula:

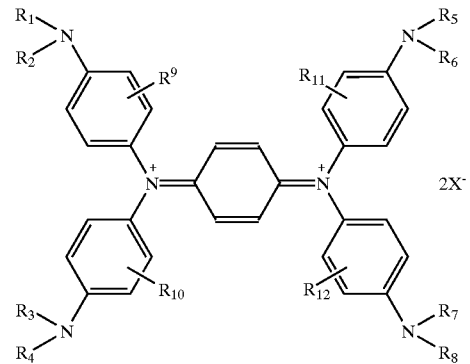

wherein $R_1$ to $R_8$ may be the same or different and represent a hydrogen atom, alkyl group, aryl group, alkenyl group, aralkyl group or alkynyl group, $R_9$ to $R_{12}$ may be the same or different and represent a hydrogen atom, halogen atom, amino group, amide group, cyano group, nitro group, carboxyl group or alkyl group, and $X^-$ represents an anion.

8. The infrared absorption filter according to claim 5, wherein the coloring matter comprises a fluorine-containing phthalocyanine-based compound.

9. The infrared absorption filter according to claim 5, wherein the coloring matter comprises a nickel complex-based compound having a structure of the general formula:

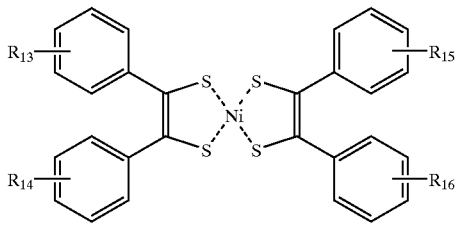

wherein $R_{13}$ to $R_{16}$ may be the same or different and represent a hydrogen atom, halogen atom, alkyl group, alkoxy group, aryl group, aralkyl group or amino group.

10. The infrared absorption filter according to claim 5,
wherein the compounding ratio of the phthalocyanine-based compound is 0.01 to 1.2 parts by weight per part by weight of the diimmonium salt-based compound, and
wherein the compounding ratio of the nickel complex-based compound is 0 to 1 part by weight per part by weight of the diimmonium salt-based compound.

11. The infrared absorption filter according to claim 5, wherein said polymer resin has a glass transition temperature ranging from 85 to 1 50° C.

12. The infrared absorption filter according to claim 5, wherein the polymer resin comprises a polyester resin.

13. The infrared absorption filter according to claim 12, wherein said polyester resin is a copolymerized polyester resin containing at least 60 mol % an alicyclic diol component of the general formula:

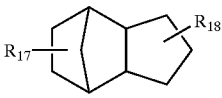

as a polyhydric alcohol, wherein $R_{17}$ and $R_{18}$ may be the same or different and represent a hydroxyl group, a hydroxyalkylene group having 1 to 8 carbon atoms, or a group obtained by adding 1 to 10 alkylene oxides to a hydroxyalkylene group having 1 to 4 carbon atoms.

14. The infrared absorption filter according to claim 1, wherein said infrared absorption layer comprises 0.05 to 5% by weight of a solvent.

15. The infrared absorption filter according to claim 1, wherein said infrared absorption layer is laminated to at least one of said adhesion layer by a coating method.

16. The infrared absorption filter according to claim 1, wherein said adhesion layer comprises a copolymerized polyester resin and a polyurethane-based resin.

17. The infrared absorption filter according to claim 1, wherein the adhesion layer comprises 0 to 3 particles, per square meter of adhesion layer, of coarse materials having a size of 100 μm or more.

18. The infrared absorption filter according to claim 1, wherein said film has a haze value of 1% or less.

19. The infrared absorption filter according to claim 1, wherein a reflection prevention layer is laminated on the outermost layer of the filter.

20. The infrared absorption filter according to claim 1, wherein an anti-glare treatment layer is laminated on the outermost layer of the filter.

21. A plasma display comprising the infrared absorption filter of claim 1.

* * * * *